(12) United States Patent
Young et al.

(10) Patent No.: US 12,190,168 B2
(45) Date of Patent: Jan. 7, 2025

(54) INTEGRATED EDGE CLOUD ARCHITECTURE

(71) Applicant: Cachengo, Inc., Huntingdon, TN (US)

(72) Inventors: Ashlee Michael Young, Huntingdon, TN (US); Jimmy G. Lafontaine Rivera, San Juan, PR (US)

(73) Assignee: Cachengo, Inc., Huntingdon, TN (US)

( * ) Notice: Subject to any disclaimer, the term of this patent is extended or adjusted under 35 U.S.C. 154(b) by 446 days.

(21) Appl. No.: 17/450,034

(22) Filed: Oct. 5, 2021

(65) Prior Publication Data
US 2022/0107845 A1 Apr. 7, 2022

Related U.S. Application Data

(60) Provisional application No. 63/198,235, filed on Oct. 5, 2020.

(51) Int. Cl.
*G06F 9/455* (2018.01)
*G06F 9/50* (2006.01)
(Continued)

(52) U.S. Cl.
CPC ........ *G06F 9/5072* (2013.01); *G06F 9/45558* (2013.01); *G06F 9/5077* (2013.01);
(Continued)

(58) Field of Classification Search
CPC .................................................. G06F 9/45558
(Continued)

(56) References Cited

U.S. PATENT DOCUMENTS 9,807,118 B2 * 10/2017 Nadkarni ............... H04L 63/145
2016/0127254 A1 * 5/2016 Kumar ................ H04L 41/0803
709/226

(Continued)

FOREIGN PATENT DOCUMENTS

WO 2018005297 1/2018

OTHER PUBLICATIONS

"International Application Serial No. PCT US2021 071731, International Search Report mailed Jan. 24, 2022", 2 pgs.
(Continued)

*Primary Examiner* — Mehran Kamran
(74) *Attorney, Agent, or Firm* — Schwegman Lundberg & Woessner, P.A.

(57) ABSTRACT

A system is described to manage a plurality of managed devices. The system may have an Application Program Interface (API), a messaging platform, an application manager, and a payments manager. The Application Program Interface (API) may be configured to communicate with a user computer to request use of one or more of the managed devices. The messaging platform may be configured to send and receive messages to the managed devices. The messaging platform operates using a publish/subscribe protocol and the messages control installation of applications requested by the user computer, and allow communications between managed devices based on topics. The application manager, in communication with the messaging platform, deploys applications on the managed devices. The payments manager processes payment for the use of the one or more managed devices.

20 Claims, 13 Drawing Sheets

(51) Int. Cl.
  *G06F 9/54*        (2006.01)
  *G06F 11/34*       (2006.01)
(52) U.S. Cl.
  CPC .............. *G06F 9/542* (2013.01); *G06F 9/547* (2013.01); *G06F 11/3409* (2013.01); *G06F 2009/45562* (2013.01); *G06F 2009/45595* (2013.01); *G06F 2209/541* (2013.01); *G06F 2209/547* (2013.01); *G06F 2209/548* (2013.01)
(58) Field of Classification Search
  USPC ........................................................... 718/1
  See application file for complete search history.

(56)               References Cited

U.S. PATENT DOCUMENTS

| 2016/0337238 | A1* | 11/2016 | Hellkvist ................ H04L 41/12 |
| 2017/0316418 | A1* | 11/2017 | Sarin ....................... H04W 4/24 |
| 2017/0366616 | A1* | 12/2017 | Rodrigues Nascimento ............... H04W 4/44 |
| 2018/0006884 | A1* | 1/2018  | Zimmermann ..... H04L 41/0806 |
| 2019/0041830 | A1* | 2/2019  | Yarvis .................. G05B 19/054 |
| 2022/0107845 | A1* | 4/2022  | Young ..................... G06F 9/547 |
| 2023/0214283 | A1* | 7/2023  | Young .................... H04L 67/10 709/204 |

OTHER PUBLICATIONS

"International Application Serial No. PCT US2021 071731, Written Opinion mailed Jan. 24, 2022", 6 pgs.

\* cited by examiner

INTEGRATED EDGE CLOUD ARCHITECTURE

PRIORITY CLAIM

This application claims priority to U.S. Provisional Patent Application Ser. No. 63/198,235, entitled "INTEGRATED EDGE CLOUD ARCHITECTURE" and filed on Oct. 5, 2020, which is incorporated herein by reference in its entirety.

TECHNICAL FIELD

This application relates to an integrated edge cloud architecture.

BACKGROUND

In a conventional server deployment environment, when a new virtual server instance is deployed on Amazon Web Services (AWS™) or Google Cloud™, upon conclusion of the installation process, an Internet Protocol (IP) address is provided by the service. This IP address is a public IP address and the installation process guides the new user through a firewall configuration to access the virtual machine. This firewall configuration (also known as a Security Group) has a default configuration to allow only SSH communications by default. The user can either give the service provider an associated public key, or the user can create a new public key (e.g., an Amazon created key). The user then gains access to the virtual machine using the public key and not through a username and a password. Since the IP address of the virtual server is publicly accessible, the virtual machine is open to unauthorized access if any person has access to the key pair or in case of a vulnerability in the SSH service or its configuration. Accordingly, the server is at risk of a malicious attack.

BRIEF DESCRIPTION OF THE DRAWINGS

Example embodiments are illustrated by way of example, and not limitation, in the figures of the accompanying drawings, in which like references indicate the same or similar elements. In the drawings.

DETAILED DESCRIPTION

Example methods and systems are directed to an integrated cloud architecture. A management system may manage all communications (e.g., using publish-subscribe protocol) between user devices and managed devices, deployment of applications on the managed devices, control operations or functionality on the managed devices (e.g., restrict commands that may be executed by a user of a managed device), manage financial aspects (e.g., payment of licensing fees of applications deployed on the managed devices), monitor and record the communications between the managed devices and/or the user devices), and so on. As described in more detail below, the management system is shown, by way of example, to include a software-defined wide area network (SD-WAN) manager and a communication hub using a publish-subscribe network protocol or any peer-to-peer protocol. The communication hub may provision the SD-WAN manager to create peer groups between various devices of the system. The various devices in the peer groups may then communicate via the SD-WAN manager. In an example embodiment, the management system is used to manage a plurality of virtual servers. However, it is to be appreciated that the management system may manage any device or computer system. Further, the management system includes analytics capabilities, payment functionality to manage payments related to the managed devices, authentication functionality to authenticate the managed devices, an application manager to manage the installation of applications on the managed device, and so on.

Thus, in an example embodiment, the management system allows various machines, vendors, and services to operate in a marketplace and allow trusted trade, sales, installation, and servicing of machines, without any physical presence or benefits of monitors, keyboards, or mice. In an example embodiment, a protocol ensures that only trusted relationships are formed and allowed access to physical controls.

Figure 1:
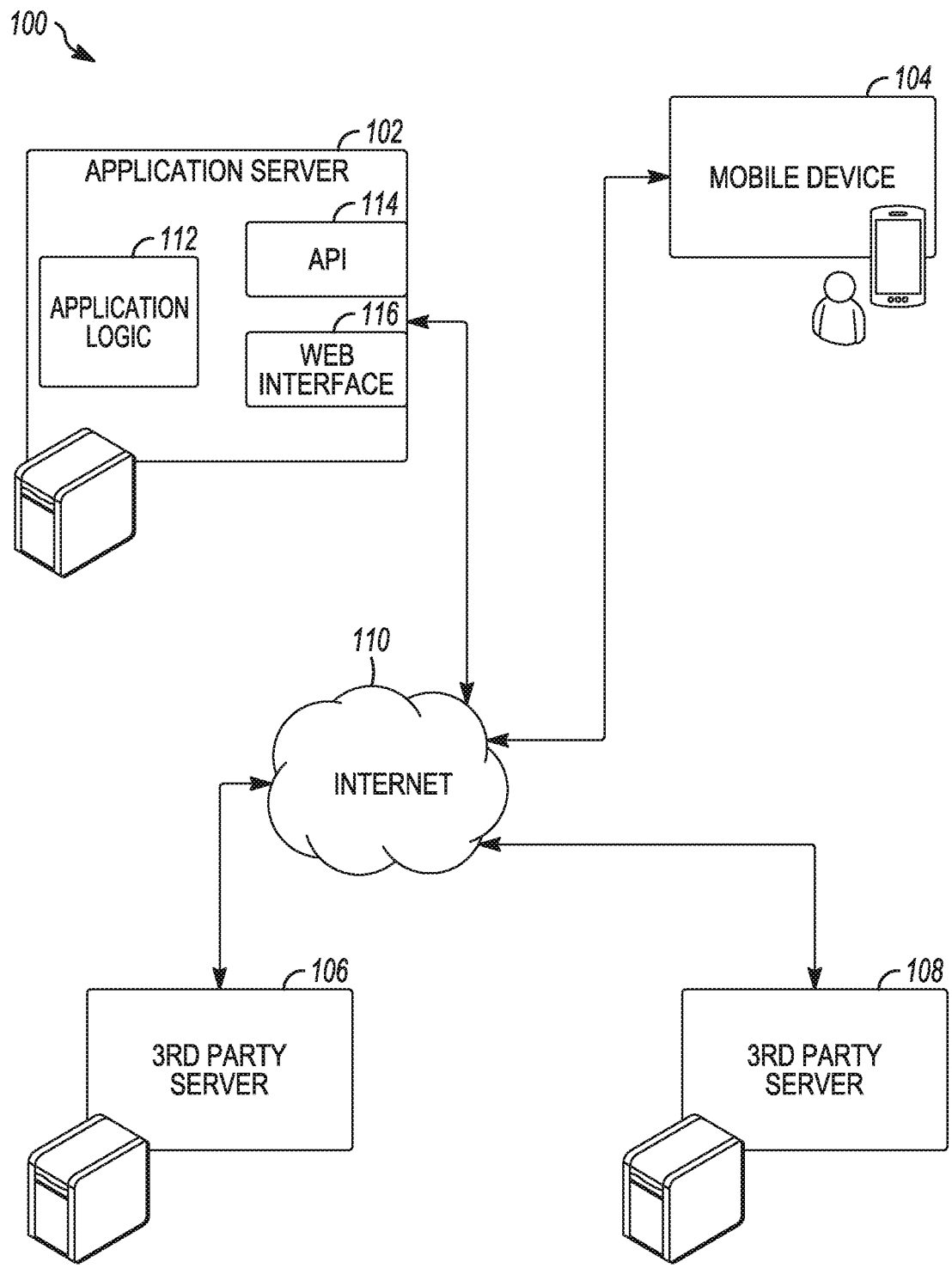
FIG. 1 is an example technology platform where an integrated edge cloud architecture may be deployed.

Referring to the drawings, FIG. 1 is an example technology platform 100 where an integrated edge cloud architecture may be deployed. The technology platform 100 is shown to include an application server 102, a plurality of connected devices (e.g., a mobile device 104), and a plurality of third-party servers (e.g., third-party servers 106, 108). The application server 102, the mobile device 104, and the third-party servers 106, 108 are interconnected via the Internet 110. The application server 102 is shown by way of example to include application logic 112, an Application Program Interface (API) 114, and a web interface 116 connected to the Internet 110. In some example embodiments, the technology platform 100 provides an integrated market for computing applications providing provisioning, licensing, payment, analytics of digital assets/applications, and other functionality deployed by the technology platform 100.

Figure 2:
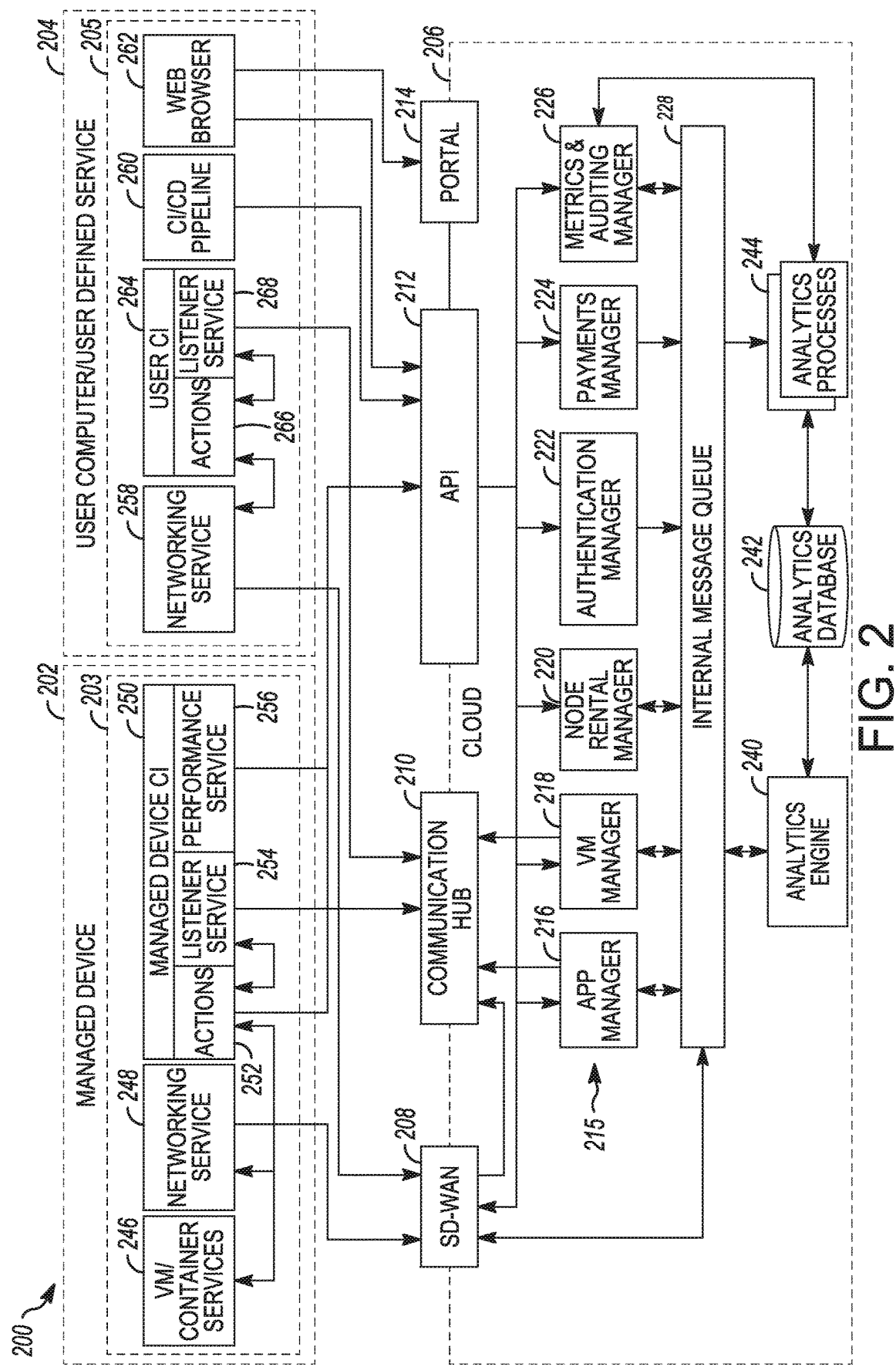
FIG. 2 is a schematic diagram of a management system, in accordance with an example embodiment, to provide an integrated edge cloud architecture.

FIG. 2 is a schematic diagram of a system 200, in accordance with an example embodiment, to provide an integrated edge cloud architecture. The system 200 may be deployed on the technology platform 100 and, accordingly, is described merely by way of example with reference thereto. It is however to be appreciated that the system 200 may be deployed on other platforms that may differ from the platform 100.

As described in more detail below, in example embodiments, all communications with managed devices in the system 200 are through a communication hub using a publish-subscribe network protocol. The communication hub can then enable, when required, communications via a Software Defined Wide Area Network (SD-WAN). In an example embodiment, this publish-subscribe network protocol stands unique in how it is implemented. It may facilitate the execution of other synchronous protocols such as Secure Shell (SSH) over an otherwise asynchronous method. It also provides for robust auditing, in stark contrast to other implementations. It may also allow a supervisor or other administrator to ensure that only authorized functions are carried out. In security terms, this publish-subscribe protocol may ensure that authorized users only carry out authorized operations. In other example systems, unauthorized users may be prevented from gaining access to a physical system, but other authorized users might perform rogue functions. This protocol inhibits that from happening as operations performed by any user may be restricted.

The system 200 includes a plurality of managed devices (e.g., managed device 202), a plurality of user computers (e.g., a user computer 204 that may communicate via a user defined service(s)), and an integrated edge management system 206. The management system 206 is shown to include a plurality of communication interfaces including, but not limited to, an SD-WAN manager 208, a communication hub 210, an Application Program Interface (API) 212, and a portal 214. The communication interfaces allow the management system 206 to communicate with the managed device 202 and the user computer 204. Example managed devices include electronics in datacenters, light poles, airplanes, motor vehicles, mobile phones, personal computers, television sets, and any other electronic devices. It is to be appreciated that the managed devices may be any computing device located at any geographical location.

The example management system 206 is also shown to include a plurality of management modules 215 that include the SD-WAN manager 208, an application manager 216, a virtual machine (VM) manager 218, a node rental manager 220, an authorization manager 222, a payments manager 224 and a metrics and auditing manager 226. The management modules 215 stream messages to each other, the SD-WAN manager 208, and other components of the management system 206 via an internal message queue 228. Further, the management modules 215 may directly message each other through the API 212. The portal 214 communicates with the API 212 which then handles communication with any of the components of the management system 206. In an example embodiment, the portal 214 serves as a human friendly (as opposed to programmatic) way to execute API functions. Accordingly, it may enable clients to install applications (e.g., via the user computer 204) or deploy Peer Groups to any device straight from their browser.

The management system 206 further includes an analytics engine 240, an analytics database 242, and a plurality of analytics processes 244. In an example embodiment, core functionality is provided by the management modules 215 that provide a variety of services.

Returning to the communication hub 210, in an example embodiment it provides a center of all communications. As can be seen in FIG. 2, the communication hub 210 provides back-end management services, provided by the management modules 215, to communicate to managed devices (e.g., the managed device 202) through firewalls. In an example embodiment, the communication hub 210 uses Message Queuing Telemetry Transport (MQTT) protocol to communicate with the managed device 202 and the user computer 204. It should be noted that the messaging protocol MQTT is merely an example protocol and that any messaging protocol that works on an outbound connection from a managed device to a known broker, may also be used. Other example protocols include Advanced Message Queuing Protocol (AMQP), Constrained Application Protocol (CoAP), Extensible Messaging Presence Protocol (XMPP), WebSockets, and so on. In an example embodiment, the system 200 uses MATT over WebSockets. The communication hub 210 may thus be configured as MQTT broker running in the cloud on the management system 206. MQTTE is a lightweight publish/subscribe messaging protocol designed for M2M (machine to machine) telemetry in low-bandwidth environments. The protocol usually runs over TCP/IP networks (see the Internet 110 in FIG. 1). It is, however, to be appreciated that other protocols may in addition, or instead, be used by the communication hub 210 to communicate with the managed device 202 and the user computer 204 (or any other devices connected to the management system 206). Devices (such as the managed device 202 and the user computer 204) may communicate with the communication hub 210 by first authenticating themselves through asymmetric keys. Accordingly, the communication hub 210 can be sure that it is communicating with a known and recognized device.

The communication hub 210 is also configured to encrypt the communications between the management system 206 and the managed devices 202 of the system 200. Accordingly, in an example embodiment, the communication hub 210 may define a messaging platform. Secure commands may thus be sent between the managed device 202, the user computer 204, and the management system 206. This is in stark contrast to conventional systems that use secure shell (SSH) protocol to send control commands in which devices have to directly access an open port in the managed device. In some example embodiments described herein, the communication hub 210 does not require an open port but rather uses MQTT protocol to establish secure connections. As MQTT protocol sends connection credentials in plain text format, the communication hub 210 is additionally configured to use documents signed with asymmetric keys as short-lived passwords generated by the managed device 202. These passwords may include a single-use token or nonce to prevent a password from being used twice. Accordingly, the communication hub 210 allows a persistent connection and may use a Transport Layer Security (TLS) connection between the management system 206, the managed device 202, and the user computer 204.

The management system 206 is configured to send instructions through the communication hub 210 to the managed device 202 and to the user computer 204. For example, the management system 206 may send instructions to the managed device 202 to install applications as well as instructions to join the SD-WAN manager 208. In some example embodiments, the communication hub 210 is configured to allow the managed device 202 to join a tunnel-less SD-WAN which allows the various devices of the system 200 to directly communicate with each other via an Internet Protocol (IP) address even though they may be on completely separate physical networks and behind different firewalls.

The SD-WAN manager 208 enables managed devices (e.g., the managed device 202) to communicate directly with each other through an IP stack regardless of the physical network they are in. This is very different from current Virtual Private Network (VPN) solutions which rely on a tunnel to proxy packages from one device to another in order to allow devices to communicate while being behind firewalls. Direct communication between devices eliminates the VPN tunnel as a bottleneck and single point of failure for all communications as well as the need for specialized tunneling hardware. The lack of a VPN tunnel and full encryption also minimize the risks for denial-of-service (DDOS) and man-in-the-middle (MITM) attacks.

The communication hub 210 may act as an MQTT broker. An MQTT broker acts as a post office; MQTT protocol doesn't use the address of remote devices (e.g., the managed device 202 and the user computer 204) but uses a subject line called a "Topic". A device that wants a copy of that message will subscribe to that topic. In an example embodiment, the functions of the internal message queue 228 and the communication hub 210 (messaging platform) are very different, although the communication hub 210 could be burdened to perform the functions of the internal message queue 228. In an example embodiment, the main difference is that the internal message queue 228 is a persistent log of messages that the communication hub 210 has ever published, and any other newly installed service (e.g., an application or new node installed on a managed device 202) can catch up on history whenever it wants. In the case of the communication hub 210, any public device can connect to it, but the devices may only be allowed to subscribe to certain topics (e.g., topics that are a combination of protocol and port number, which might otherwise correspond to a service). Once a message is received by a subscriber (managed device 202), it is deleted from the messaging queue of the communication hub 210 and the device cannot fetch it again, but it will remain in the database of messages.

The managed device 202 and the user computer 204 can both send and receive data by both publishing and subscribing. In an example embodiment, however, the managed devices 202 and the user computer 204 may be prevented from publishing data directly to the communication hub 210 acting as a broker and may be forced to go through the API 212 instead. Decoupling the managed device 202 and the user computer 204 allows for granular control of allowed actions as well as advanced command monitoring and auditing. In an example embodiment, this allows for better programmability when dispatching a task over many managed devices 202, for example, a bulk update or installation of a service. In an example embodiment, the communication hub 210 uses Transfer Layer Security (TLS) encryption and username, password authentication to provide highly secure connections between clients, and the clients and the broker. In the system 200, the managed device 202 and the user computer 204 do not require direct access to each other through an IP address, thus providing a more secure environment.

In an example embodiment, the SD-WAN manager 208 is configured to operate in completely peer-to-peer manner. Communications, including data, do not flow through an intermediate gateway. The SD-WAN manager 208 has a broker that enables two devices to initiate communications between each other, and then they can communicate directly to each other once they have been added to the same overlay network and to the access control list for the resulting peer group. This may be accomplished by having the devices open outgoing connections to the communications hub 210 that stores information on ports and addresses related to these connections. When two managed devices 202 need to communicate, the communication hub 210 shares this information with each of the managed devices 202, which the managed devices 202 use to communicate directly with each other. All direct communication between the managed devices 202 may be end-to-end encrypted using asymmetric key encryption, which the managed devices 202 use to authenticate and authorize incoming communication.

It is to be appreciated that the communication hub 210 may send various different instructions to the managed device 202 and the user computer 204. For example, the application manager 216 can install an application on the managed device 202. In some example embodiments, the application manager 216 installs containerized applications (e.g., using an OS-level virtualization method) on the managed device 202. Thus, the communication hub 210 may deploy and run distributed applications without launching an entire virtual machine (VM) for each application on the managed device 202.

In one example use scenario, the VM manager 218 may install virtual machines on the managed device 202. Accordingly, the managed device 202 may be a client device such as a server. Once a client has registered a managed device 202 through the portal 214 or the API 212, subsequent communications with the management system 206 are via the communication hub 210.

The managed device 202 has managed device software components 203 including, for example, a VM/container services module 246, a networking services module 248, and a managed device Command Interface (CI) 250. The managed device CI 250 may, for example, be a software module, and establish a connection to the communication hub 210 of the management system 206 via a listener service sub-module 254. An actions sub-module 252 may handle all messages received by the listener service sub-module 254, parse them and either execute the necessary action (e.g., install an application) or relay the messages to the VM/container services module 246 (e.g., for managing Docker Containers) or the networking services module 248 (e.g., for joining or leaving Peer Groups), when necessary. The managed device CI 250 is shown to also include a performance service module 256, which collects system metrics and sends them to the API 212 for recording and analysis.

The managed device CI 250 provides the ability for the managed device 202 to communicate with the management system 206 via the communication hub 210. Communications may thus securely be made using, for example, MQTT protocol. Examples functions performed by the managed device CI 250 include connecting and disconnecting from the SD-WAN manager 208 via the networking services module 248, installing applications, instantiating virtual machines via the VM/container services module 246, and so on.

In an example embodiment, there are two routes of communication between the managed device CI 250 and the management system 206. The first route is through the communication hub 210, which allows the managed device CI 250 to receive messages from the management system 206 and its services despite being behind restrictive firewalls. This route may be used for control and configuration of the managed device 202. The second route is through the API 212, which allows the managed device CI 250 to send messages to the management system 206 and its components. The second route may be used to report system statistics, updates, and logs.

Returning to the management modules 215, the payments manager 224 manages financial aspects such as billing of a node (e.g., an application that has been deployed on the managed device 202) or a node that has been rented by a user (e.g., via the node rental manager 220). For example, when the managed device 202 is a mobile phone, the management system 206, via the managed device CI 250, may deploy an application (e.g., a security application) on the mobile phone and the payments manager 224 may manage all financial aspects associated therewith (e.g., licensing fees, fees to manage the managed device 202, and so on). The payments manager 224 also manages payouts to sellers who participate in revenue sharing programs (e.g., third-party app marketplace, node rental, etc.). The node rental manager 220 includes software for the monetization of renting available CPU and/or storage to a third-party. In an example embodiment, the node rental manager 220 communicates with the VM/container services module 246 to bring up virtual machines, which can be used by the third-party. The node rental manager 220 also includes software for securing the managed device 202 and making it available in a device rental marketplace. In an example embodiment, the aforementioned example functionality is tightly integrated and in-band as opposed to being a series of asynchronous and out-of-band functionality. For example, in the system 200, a customer can purchase a license to an application and automatically download and install the package on a managed device 202; and the license is automatically applied to the installation. Many devices can also be selected, and when the application is selected for purchase, a corresponding number of licenses can be purchased, applied, and the subsequent applications installed onto the many devices in a single, automated process.

In conventional marketplace-type mechanisms, there might be "trust" extended between a client and a vendor, but that does not necessarily extend to any device. Similarly, with blockchain and other technologies, "trust" may be extended between devices to connect and communicate with one another, but that does not extend to other third-party software companies. Further, payment processing tends to be completely orthogonal to the notion of "trust". Payments are made and received, but tokens still need to be applied. This series of conventional ad-hoc steps does not scale in an edge deployment where thousands to millions of devices may need to be managed in bulk fashion by a customer.

In an example embodiment, the application manager 216 includes software to perform automated deployment and configuration of target applications on a managed device 202. The application manager 216 may store specific instructions for installing and uninstalling an application and sends these instructions to a managed device 202 through the communication hub 210. No VPNs or the like are necessary even if the managed device 202 is located behind a firewall. Communications take place directly between the management system 206 and the managed device 202 without any proxy. The application manager 216 may be informed of updates about an installation's status through the API 212. In an example embodiment, the application manager 216 includes software to monetize operations such as the licensing and installation of third-party applications through an application marketplace although charging customer and paying out license fees may be delegated to the payments manager 224.

The authorization manager 222 is configured to help ensure that any action or operation performed in the system 200 is instructed only by authorized parties/devices. In an example embodiment, the authorization manager uses asymmetric key encryption to authenticate automated users or username/password combinations to authenticate human users. The authorization manager 222 responds to valid authentication requests with an asymmetrically signed authentication token, which can be used to make requests to any of the services within the systems which are aware of the public key of the authorization manager 222.

The payments manager 224 operates in conjunction with the node rental manager 220 to ensure users pay for use of their license and other services provided by the system 200. For example, payments may be required for licenses before they can be used on the managed device 202, payments for management fees for the server installed on the managed device 202, and so on.

The metrics and auditing manager 226 collects metrics on all activities performed by the system 200. These activities include services provided by the management system 206 and services on the managed device 202. Accordingly, the metrics and auditing manager 226 is in communication with the analytics processes 244, the analytics database 242, and the analytics engine 240 and can provide detailed analytics on any action performed on a managed device 202. A brief list of example uses include post-incident auditing of a managed device's usage, setting up automatic alerts upon certain thresholds being met or exceeded, or even intrusion detection using Machine Learning (ML). In an example embodiment, the portal, communication hub 210, the managed device CL 250, and the payments manager 224 work together with the metrics and auditing manager 226 to ensure the system 200 can not only track micro utilization of system-wide resources, but that such utilizations can be accounted for and billing accurately to appropriate providers deploying services via the user computers 204.

As shown in FIG. 2, the management modules 215 are connected to the internal message queue 228. In an example embodiment, the internal message queue 228 is a common style of infrastructure that provides a plurality of independent microservices that have loose dependencies on each other. The internal message queue 228 is not accessible external to the management system 206, for example, to the user computers 204. The internal message queue 228 may manage the creation and deletion of accounts in the system 200 and selectively publish this information or other relevant events deletion of accounts, adding and accounts, etc.).

Events related to any services may be published to the internal message queue 228. For example, if a client fails to meet a payment, the payments manager 224 may publish an event to the internal message queue 228. The node rental manager 220 may then uninstall an application or any other software component associated with the delinquent account. Another example of the use of the internal message queue 228 is if a user or customer wants to stop rental of a virtual machine managed by the management system 206. In this case, when the user terminates the virtual machine, the VM/container manager 218 publishes an event to the internal message queue 228. The node rental manager 220 reads this event, updates its database, and instructs the payments manager 224 to stop charging for the service. The internal message queue 228 may allow for auditing activities on the system 200, monitoring compliance with rules, and so on.

In an example embodiment, the internal message queue 228 is completely rule less, having no rules, and merely publishes all information it receives. Accordingly, the listening services sub-module 254 receiving the publication may have intelligence built into act, not to act, or how to act to a published message. The analytics engine 240 may listen to all published messages and include rules to make decisions on actions that should be performed responsive to the messages. In an example embodiment substantially all messages are stored so that services that subsequently join the system 200 may access them. For example, the VM manager 218 and the node rental manager 220 may listen to messages published by the internal message queue 228 and, if the payments manager 224 publishes any messages, via the internal message queue 228, it performs one or more defined actions (e.g., disable the virtual machine) associated with a delinquent user. Each of the management modules 215 may subscribe to messages that are only relevant to their functionality.

Returning to the analytics engine 240, in an example embodiment, an index is provided to index all messages. For example, messages relating to managed devices 202 that are servers deployed and managed by the management system 206 may be monitored to perform analytics on the servers. Example analytics include CPU performance data, load distribution on the machines, application installation data, network traffic, and so on. Analytics on all services, provided by the management system 206, may be generated based on data sourced from messages on the internal message queue 228. The analytics data is stored in the analytics database 242. In an example embodiment, the analytics engine 240 includes artificial intelligence (AI)/machine learning (ML) software to build machine learning models and analyze at least some of the analytics data. The analytics engine 240 may be used to analyze published messages thereby to detect potential intrusion into the system 200 by any unauthorized device. Similarly, tasks carried out by authorized individuals and devices that are not in alignment with other authorized actions can be detected and reported. Detection of a potential intrusion event may trigger a warning event, for example, sending an email to the organization involved, or canceling an account, sending a message to Amazon Web Services (AWS) if a virtual machine is hosted on their platform, causing the VM manager 218 to bring down a virtual machine, remove network access in the SD-WAN manager 208, or the like.

The user computer 204 is shown, by way of example, having user computer software components 205 including a networking service 258, a continuous integration/continuous delivery (CI/CD) pipeline 260, a web browser 262, and user CI 264. The user CI 264 is shown to include an actions module 266 and a listener services module 268. The listener services module 268 is operatively in communication with the communication hub 210 and the networking service 258 is operatively in communication with the SD-WAN manager 208. A user computer may be used to run a CI/CD pipeline 260 or a web browser 262 to communicate with the management system 206 via the API 212.

An example deployment by a user organization utilizing the user computer 204 may be as follows. A provider of digital media content (e.g., movies, TV programs, documentaries, or the like) may purchase several managed devices 202 in the form of servers, and the management system 206 then installs several software components on the servers. More particularly, the management system 206 uses the VM/container services module 246, the networking service module 248, and the managed device CI 250 on the purchased servers to ensure a particular set of software is running on the servers and that they can communicate with each other. The applications may be running on virtual machines provisioned by the VM manager 218 or otherwise. The process of installing content (e.g., a movie) on the provisioned servers (managed devices 202) may have been initiated by a user computer 204.

The user CI 264 enables a user computer 204 to participate in authorized SD-WAN manager 208 networks through the networking service 258. This functionality allows for direct communication through the IP stack between a user computer 204 and a managed device 202, which is especially useful for development purposes. This communication may be authorized by a user through the management system 206, which would trigger the communication hub 210 to send instructions to both the managed device CI 250, installed on the servers, and the user CI 264, installed on the user computer 204, to join a particular SD-WAN manager 208. Content may then be shared via the SD-WAN manager 208 through a high-bandwidth peer-to-peer connection. It will be appreciated that both the user computer 204 and the server (managed devices 202) may be behind firewalls.

In some example embodiments, the managed device 202 may be de-provisioned and dispatched to a networked location. For example, the components shown in the managed device 202 may be provided on hardware (e.g., a small form factor computer cluster) that plugs into a server rack to control one or more servers. Once installed on the managed device 202, all communications from the managed device 202 take place exclusively through the hardware hosting the VM/container services module 246, the networking service module 248, and the managed device CI 250. After installation of the hardware, all communications to and from the device are controlled by the communication hub 210 of management system 206.

The CI/CD pipeline 260 allows a user computer 204, providing a user-defined service, to automate any action (e.g., installing applications) performed by the management system 206. The CI/CD pipeline may build code, run tests, deploy new versions of software, and the like, on the managed devices 202. The CI/CD pipeline 260 allows users of the system 200 (e.g., a digital content provider (using a user computer 204) to manage their servers through pushing code to a repository. In some example embodiments, code can be run automatically and perform actions on devices managed by the system 200 (e.g., a managed device 202). Thus, the CI/CD pipeline 260 allows users of the system 200 to perform actions on managed devices 202 that they own or that are associated with an organization to which they belong, using their user computer 204. The actions are all then managed and performed through the communication hub 210.

For example, the system 200 may be used to manage laptop computers within an organization. In these circumstances the managed device 202 is then an employee laptop. The employer, using the user computer 204, may define a subset of functions/actions/commands that are required on any particular laptop or group of laptops. Using the management system 206, the employer may then provision the SD-WAN manager 208 as a tunnel-less VPN or install applications necessary for their work on each managed employee laptop. Thus, an IT department of the organization does not need to communicate directly with the devices to configure them via any unsafe network, but rather through the communication hub 210 of the management system 206. In an example virtual developer deployment, a hypervisor runs on the managed device 202 that separates, for example, a Linux™ environment from what a customer wants to install (e.g., via the user computer 204) and run.

Figure 3:
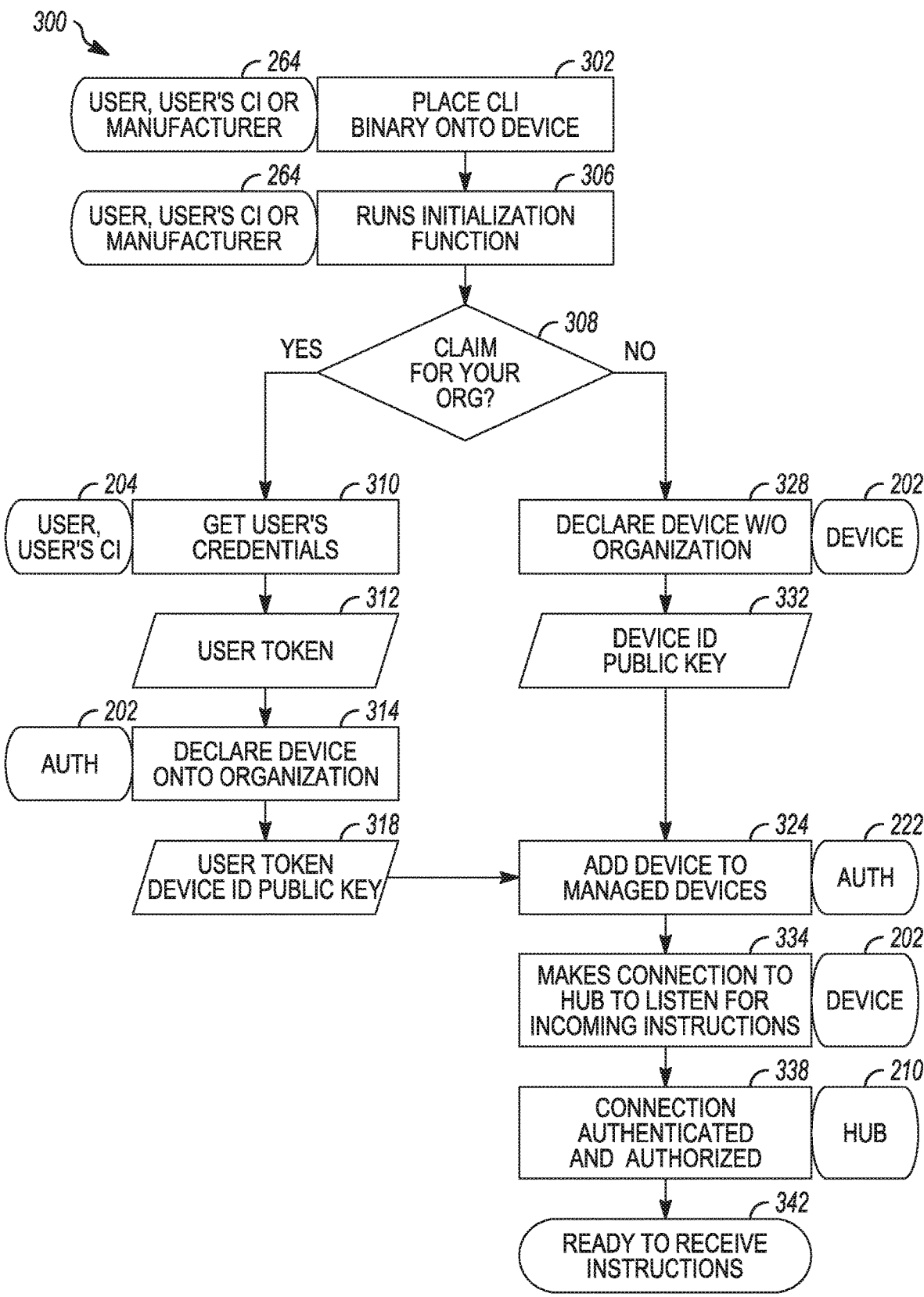
FIG. 3 is a flowchart of a method, in accordance with an example embodiment, for registering a device in an integrated edge cloud system.

FIG. 3 shows a flow chart of a method 300, in accordance with an example embodiment, for registering a device in an integrated edge cloud system. The edge cloud system may be the system 200 shown in FIG. 2 and, accordingly, is described by way of examples referenced thereto. It is, however, to be appreciated that the method 300 may be deployed on other computer systems.

The method 300 commences by installing the user CI 262 (see operation 302) on a user or subscriber computer, for example, the user computer 204. The user CI 264 may be installed during manufacture of a computing device or subsequently after purchase.

In order to register, a user may use the web browser 262 via the portal 214 (or directly through the API 212) by providing, for example, a username, password, and email address. These credentials may then be used to create a user account in the system 200. If the user is part of an organization, then the user can manage devices (e.g., managed devices 202) associated with the organization. If the user is not part of an organization registered on the system 200, then the user may be required to create and register an organization in the management system 206. If the user is part of an organization that is already registered with the management system 206, an administrator of the organization may be required to set up an account for the user. The user registration process is described in more detail below with reference to FIG. 4.

Thereafter, as shown at operation 306, an initialization function is run by the user CI 264. The initialization function may be performed by a downloaded executable that automatically installs the software components onto the managed device.

As shown at decision block 308, if there is a claim to join a particular organization, the installer gathers the credentials of the user, of the user CI 264, in order to authenticate and authorize the transaction (see operation 310). Thereafter, as shown at operation 312, a token is exchanged between the installer and the authorization manager 222. The token, a device identification (ID), and a public key is used to register or declare a managed device 202 with the management system 206 (see operations 314 and 318). Thereafter, the managed device 202 is then added to a list of managed devices that are managed by the management system 206 (see operation 324). This is accomplished by the authorization manager 222 of the management system 206. Thereafter, the managed device 202 makes a connection to the communication hub 210 to listen for incoming instructions from the management system 206 (see operation 334). The method 300 then proceeds to operation 338 where the connection is authenticated by the communication hub 210 and further communications are authorized between the managed device 202 and the management system 206. As shown at operation 342, the managed device 202 is then ready and configured to receive instructions from the communication hub 210.

Returning to decision block 308, if there is no claim to an organization (e.g., a new customer/subscriber to the system 200), the managed device 202 may be declared as a device without an organization (see operation 328). The managed device 202 uses a device ID and a public key to register with the management system 206 (see operation 332). The method 300 then proceeds to the operation 324.

Figure 4:
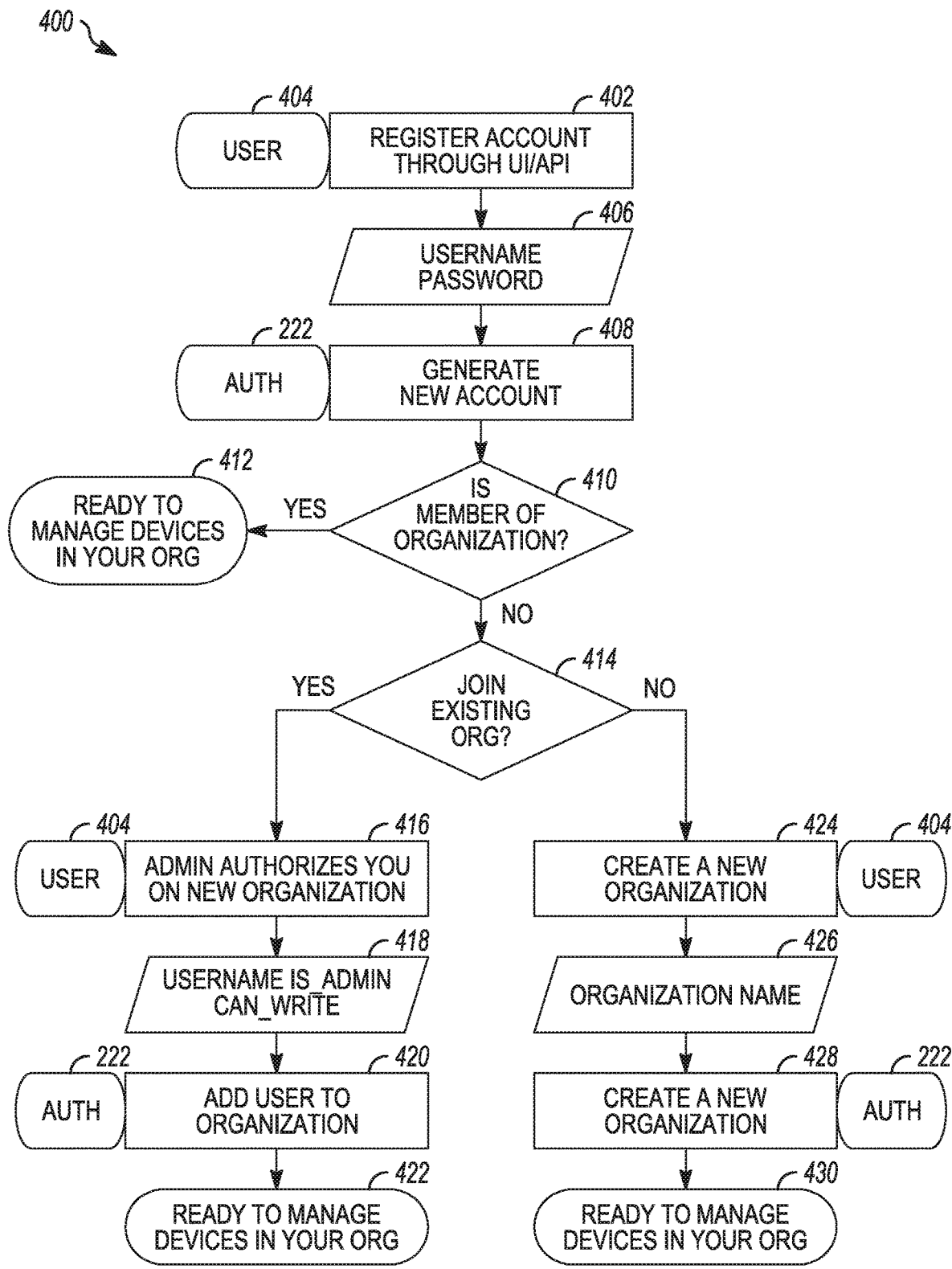
FIG. 4 is a flowchart of a method, in accordance with an example embodiment, for registering a user in the integrated edge cloud system.

FIG. 4 is a flow chart of the method 400, in accordance with an example embodiment, for registering a user (for example, of an organization) in the integrated edge cloud system. The method 400 may be deployed on the management system 200 and, accordingly, is described by way of example with reference thereto. It is, however, to be appreciated that the method 400 may deployed on other computer systems.

The method 400 commences at operation 402 where an account is registered by a user through a user interface (UI) provided on the user computer 204 (e.g., via the web browser 262). The web browser 262 may communicate with the portal 214 which, in turn, communicates with the API 212 of the management system 206. Thereafter, a username and password are defined (see operation 406) and a new account, as shown at operation 408, is generated by the management system 206. In particular, the authorization manager 222 may create the new account in the management system 206. Thereafter, as shown at decision operation 410, if the user is already a member of the organization, the user is ready to manage devices (e.g., the managed device 202) that are associated with the organization with which the member is associated (see operation 412). However, if the user is not a member of an organization, then the method 400 proceeds to decision block 414 and the method 400 asks the user whether or not they want to join an existing organization. If the user desires to join an existing organization, the method 400 proceeds to operation 416 where the management system 206 requires a user with administrative privileges to authorize the user 404 on the organization. As shown at operation 418, once the user is authorized by an administrator, and the method 400 proceeds to operation 420 where the user 404 is added to an organization within the management system 206. As shown at operation 422, the user is then ready to manage devices (e.g., the managed device 202) of the organization.

Returning to decision block 414, if the user does not want to join an existing organization, the method 400 proceeds to operation 424 where the user creates a new organization within the management system 206. In order to accomplish this, the user provides an organization name (see operation 426) and the method 400 then creates a new organization within the management system 206 as shown by operation 428. The new organization is created by the authorization manager 222. Finally, as shown at operation 430, the user is then ready to manage devices (e.g., the managed devices 202) that are associated with the organization with which the user is associated.

Figure 5:
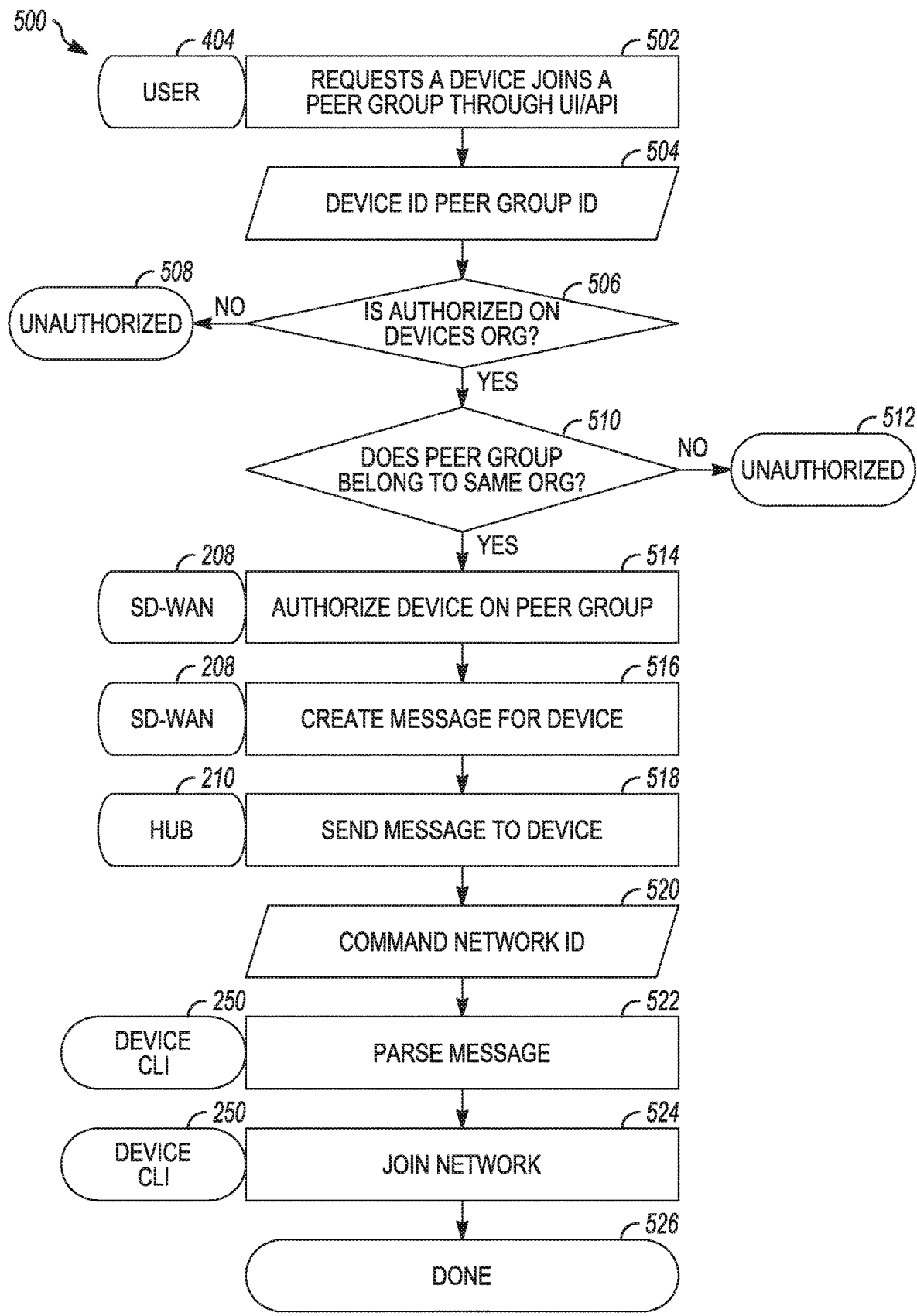
FIG. 5 is a flowchart of a method, in accordance with an example embodiment, for joining a peer group in the integrated edge cloud system.

FIG. 5 is a flow chart of a method 500, in accordance with an example embodiment, for joining a peer group in the integrated edge cloud system. The method 500 may be deployed on the management system 200 and, accordingly, is described by way of example with reference thereto. It is, however, to be appreciated that the method 500 may deployed on other computer systems.

As shown at operation 502, the user 404 may request that a managed device (e.g., the managed device 202) joins a peer group defined within the management system 206. The user may accomplish this through a user interface on the web browser 262 that communicates with the portal 214 of the management system 206 or directly through the API 212. As mentioned above, the portal 214 then communicates with the API 212 which, in turn, communicates with the various management modules 215 and the communication hub 210. As shown at operation 504, the user provides a device ID to identify the managed device, as well as a peer group ID to identify a peer group to be joined. Thereafter, as shown at decision block 506, a determination is made whether or not the managed device 202 is already an authorized device on the organization's network. If not, the request for the device to join the peer group is denied and accordingly unauthorized (see operation 508). If, however, if the managed device 202 is authorized on the organization, then the method 500 proceeds to decision operation 510, where a determination is made whether the peer group, identified by the peer group ID (see operation 504) belongs to the same organization. If not, as shown at operation 512, the request is denied, and the device is not authorized to join the peer group. If, however, the peer group identified by the peer group ID does belong to the same organization, then the method 500 proceeds to operation 514 where the managed device, identified by the device ID, is authorized to join the peer group. Authorization of the device to join the peer group is defined in the SD-WAN manager 208 of the management system 206. Thereafter, the method 500 proceeds to create a message for the device as shown at operation 516. The message for the device is created by the SD-WAN manager 208. A message is then sent to the managed device 202 by the communication hub 210, as shown at operation 518, and a command for a network ID is then issued at operation 520. The managed device 202, then, using its managed device CI 250, parses the message as shown at operation 522 and the device 202 is then authorized to join the network (see operation 524). The managed device 202 then joins the network under command of the managed device CI 250, and the method 500 terminates at operation 526, Upon joining a network, the networking service module 248 establishes a connection to the SD-WAN manager 208. The SD-WAN manager 208 may use this connection to send configuration information about the network (e.g., authorized device lists and public keys) as well as sending this information to other devices on the same network so they can establish a peer-to-peer connection. In a sample implementation, the SD-WAN manager 208 may also act as public key infrastructure (PKI) for aiding in the authentication and end-to-end encryption of peer-to-peer communication.

Figure 6:
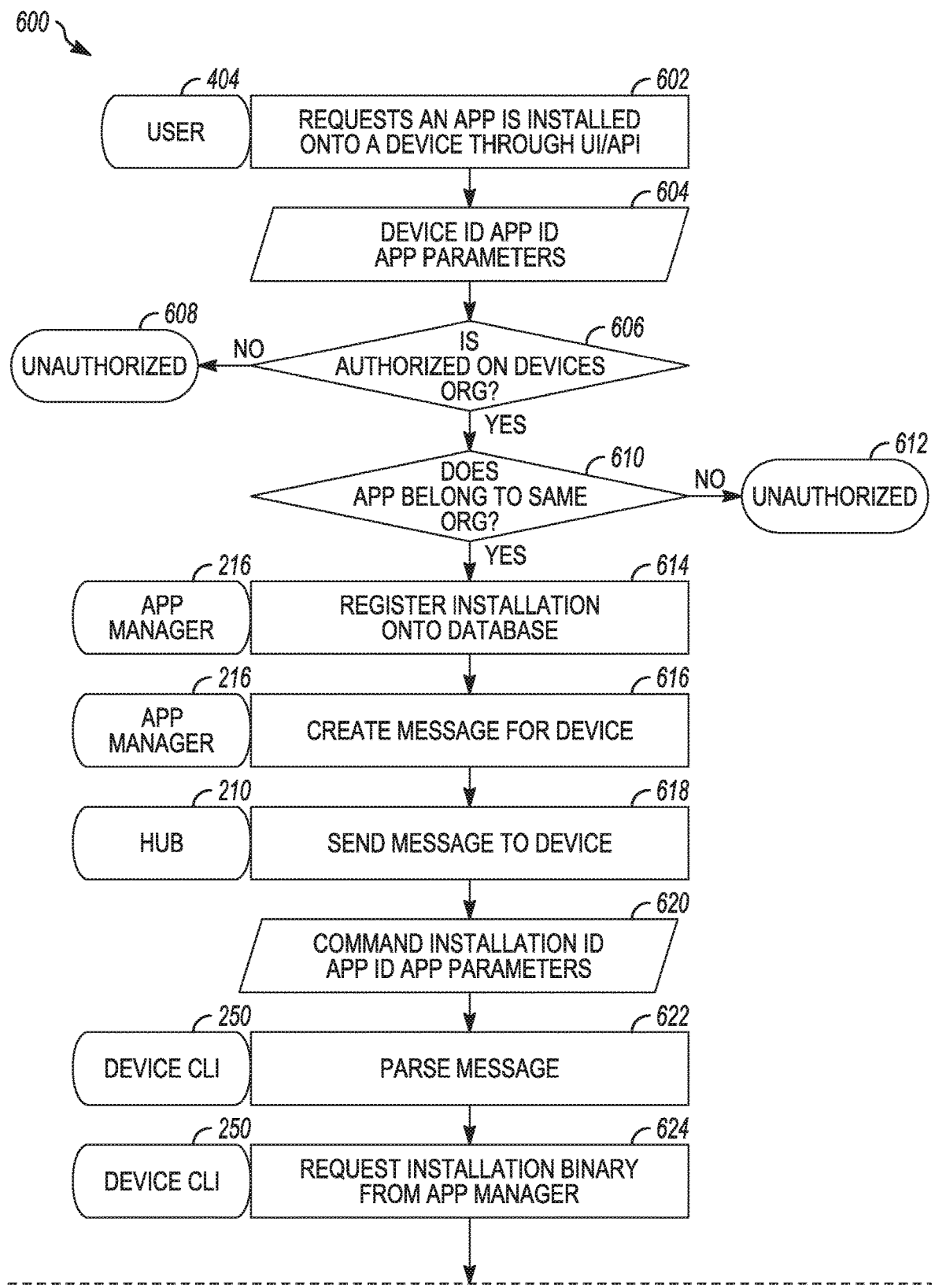
FIG. 6 is a flowchart of a method, in accordance with an example embodiment, for installing an application on a device in the integrated edge cloud system.
Figure 6:
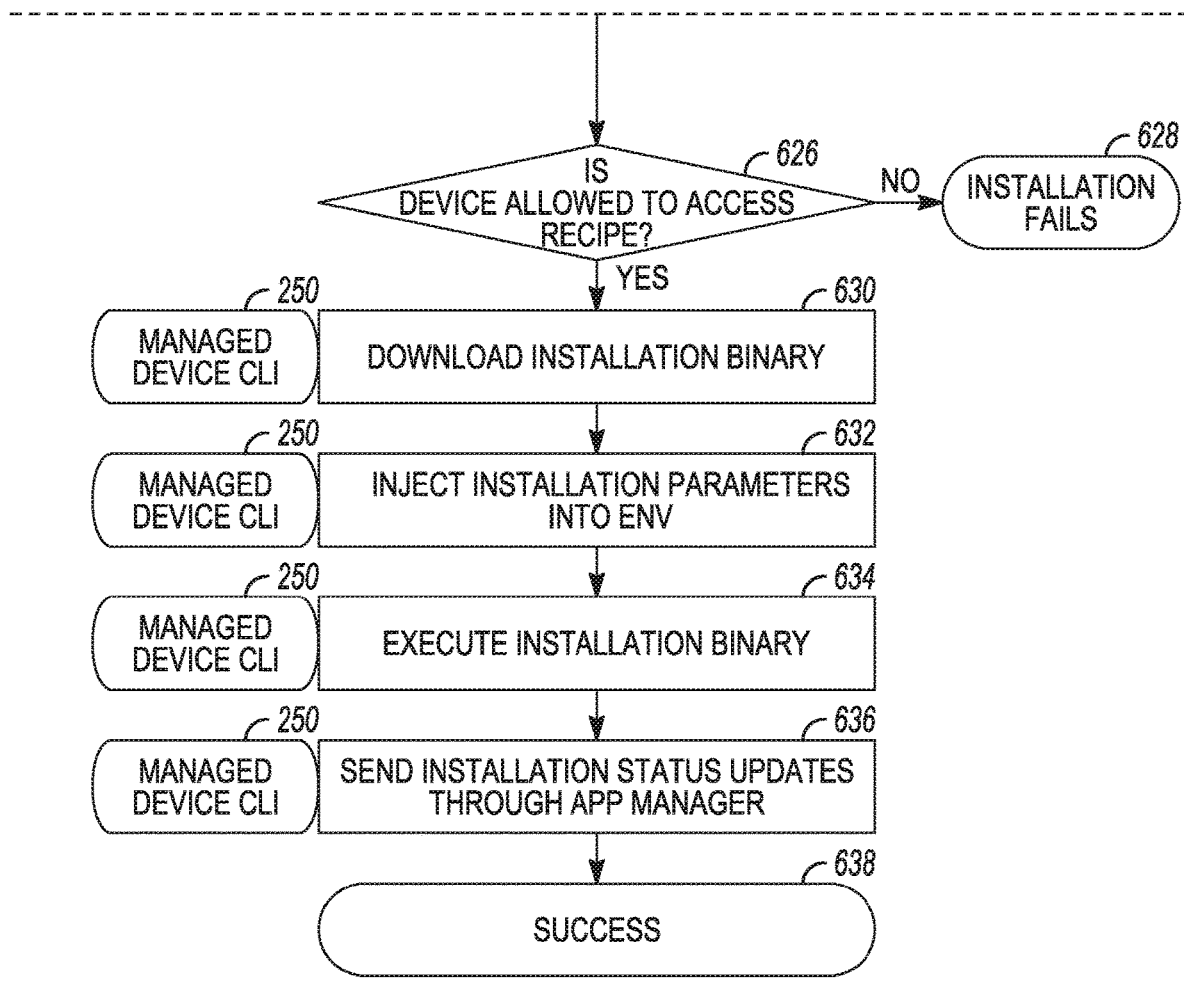

FIG. 6 is a flow chart of a method 600, in accordance with an example embodiment, for installing an application on a device in the integrated edge cloud system. The method 600 may be deployed on the system 200 and, accordingly, is described by way of example with reference thereto. It is, however, to be appreciated that the method 600 may be deployed on other systems or platforms.

As shown at operation 602, the user 404, for example via the web browser 262, requests permission from the management system 206 to install an application on the managed device 202 (for example, via the web browser 262/portal 214 or the API 212). Thereafter, as shown at operation 604, a device ID identifying the managed device 202, and an application ID identifying the application to be installed on the managed device 202, is provided to the management system 206. Further, the user 404 provides application parameters that are needed for installation of the application. Thereafter, at decision operation 606, a determination is made as to whether the managed device identified by the device ID is an authorized device of the organization. If not, the request is denied, and the installation is unauthorized as shown at operation 608. However, if the managed device 202 is an authorized device of the organization, then the method 600 proceeds to decision operation 610, where a determination is made as to whether the application belongs to the same organization. If not, the request is denied, and the installation is not authorized as shown at operation 612. However, if the application does belong to the same organization, then the method 600 proceeds to operation 614 where the application manager 216 registers an installation on its associated database as shown at operation 614. The application manager 216 then creates a message for the managed device 202 as shown at operation 616. The communication hub 210 then sends a message to the managed device 202 (see operation 618). The message includes a command, and installation ID, and application ID, and the application parameters, as shown at operation 620.

Thereafter the managed device CI 250 processes the message (see operation 622) and requests an installation binary from the application manager 216 as shown at operation 624. The method 600 determines if the managed device 202 is allowed to access the installation recipe from the application manager 216 (see operation 626). If not, the installation fails as shown at operation 628. However, if the managed device 202 is allowed to access the installation procedure, then the method 600 proceeds to operation 630 where the managed device CI 250 downloads the installation binary from the application manager 216 as shown at operation 630.

Once the installation binary has been downloaded, the managed device CI 250 injects installation parameters into the software environment of the managed device 202, as shown at operation 632. The installation binary is then executed, as shown at operation 634, by the managed device CI 250. As the installation progresses, as shown at operation 636, the managed device CI 250 sends installation status updates to the application manager 216 and the API 212. As shown at operation 638, the installation of the application is then shown as successful.

In an example embodiment, new applications can be defined in the application manager 216 by providing an executable installer and a set of parameters that it accepts for installation. In the case of containerized Docker™ applications, for example, this executable may be as simple as a one-line shell script. In more complex cases, these may be compiled installers written in the programming language of the developer's choice. The installation procedure may include any set of instructions that accomplish the installation of the application on the managed device 202. Although the installation procedure can install Docker™ applications, it should be noted that it's not limited to Docker™ installations. The installation procedure may also update any frameworks needed for an installation prior to installing the application. In an example embodiment, the installation procedure may be binaries. The instructions from the management system 206 may inject parameters into the installation environment that execute the binaries. Installation status messages may be sent from the managed device 202 to the user computer 204 (via the management system 206) during the installation process to provide updates on the installation process.

Figure 7:
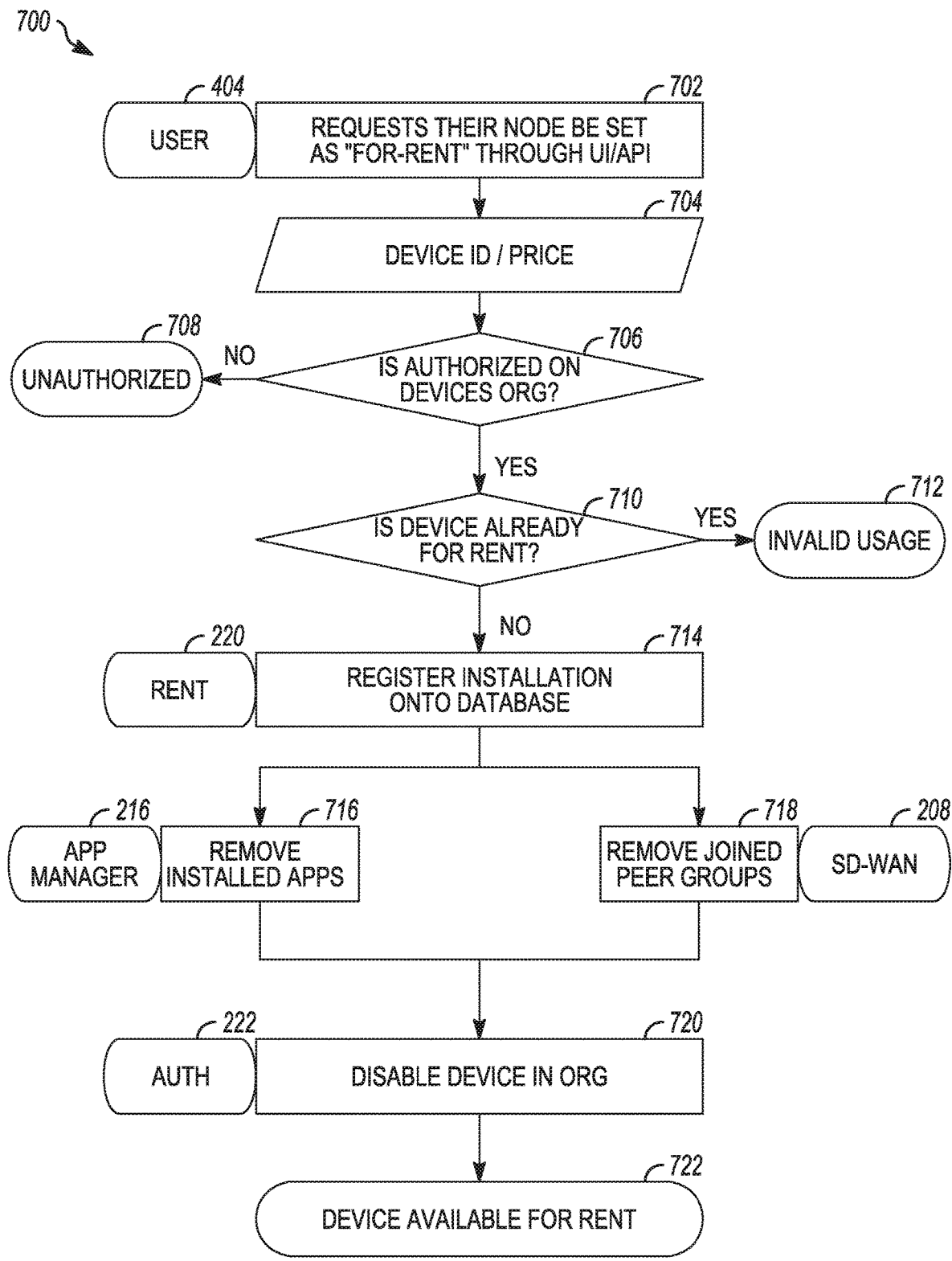
FIG. 7 is a flowchart of a method, in accordance with an example embodiment, for setting up a device for rent in the integrated edge cloud system.

FIG. 7 is a flow chart of a method 700, in accordance with an example embodiment, for setting up a device for rent in the integrated edge cloud system. The method 700 may be deployed on the system 200 and, accordingly, is described by way of example with reference thereto. It is, however, to be appreciated that the method 700 may be deployed on other systems or platforms.

As shown at operation 702, a user 404 may request that a node (e.g., one of a plurality of servers or virtual machines owned by an organization that have authorized managed devices 202) can be set as available for rent. The user of the organization may then identify a server (e.g., on the managed device 202) that they want to rent out and provide a device ID as well as a price for the rental (see operation 704). Thereafter, as shown at decision operation 706, a determination is made as to whether the managed device corresponding to the device ID belongs to the organization associated with the user, and the user has the required permissions. If not, the request is denied, and the managed device is not authorized as shown at operation 708. If, however, the managed device is authorized on the particular organization, then the method 700 proceeds to decision block 710. At decision block 710, a determination is made as to whether the managed device is already rented. If so, then the request is invalid, and usage is invalid as shown at operation 712. If, however, the managed device 202 is not already rented, then the method 700 proceeds to operation 714 where an installation is registered to a database associated with the node rental manager 220. The registration of the device may be performed by the node rental manager 220.

Thereafter, all installed applications may be removed from the managed device 202 (see operation 716) by the application manager 216. Further, the managed device 202 is also removed from all joined peer groups by the SD-WAN manager 208 as shown at operation 718. The managed device 202 is also disabled from the organization it was associated with by the authorization manager 222 (see operation 720) and the managed device 202 is identified as being available for rent (see operation 722). Thus, using the system 200 and the method 700, an organization that owns a plurality of servers (for example, specifically configured managed devices 202) may rent out the servers to other organizations or users. Payments for rental of the servers may be managed by the payments manager 224. The system 200 may thus provide a market where use of servers can be brokered by owners of the servers and users requiring rental of the servers. In an example embodiment, the management system 206 may be used to define the properties of a rented server. For example, the management system 206 may allow the user to define the physical characteristics (e.g., GPU speed, CPU speed, available RAM, etc. for any given rental).

Figure 8:
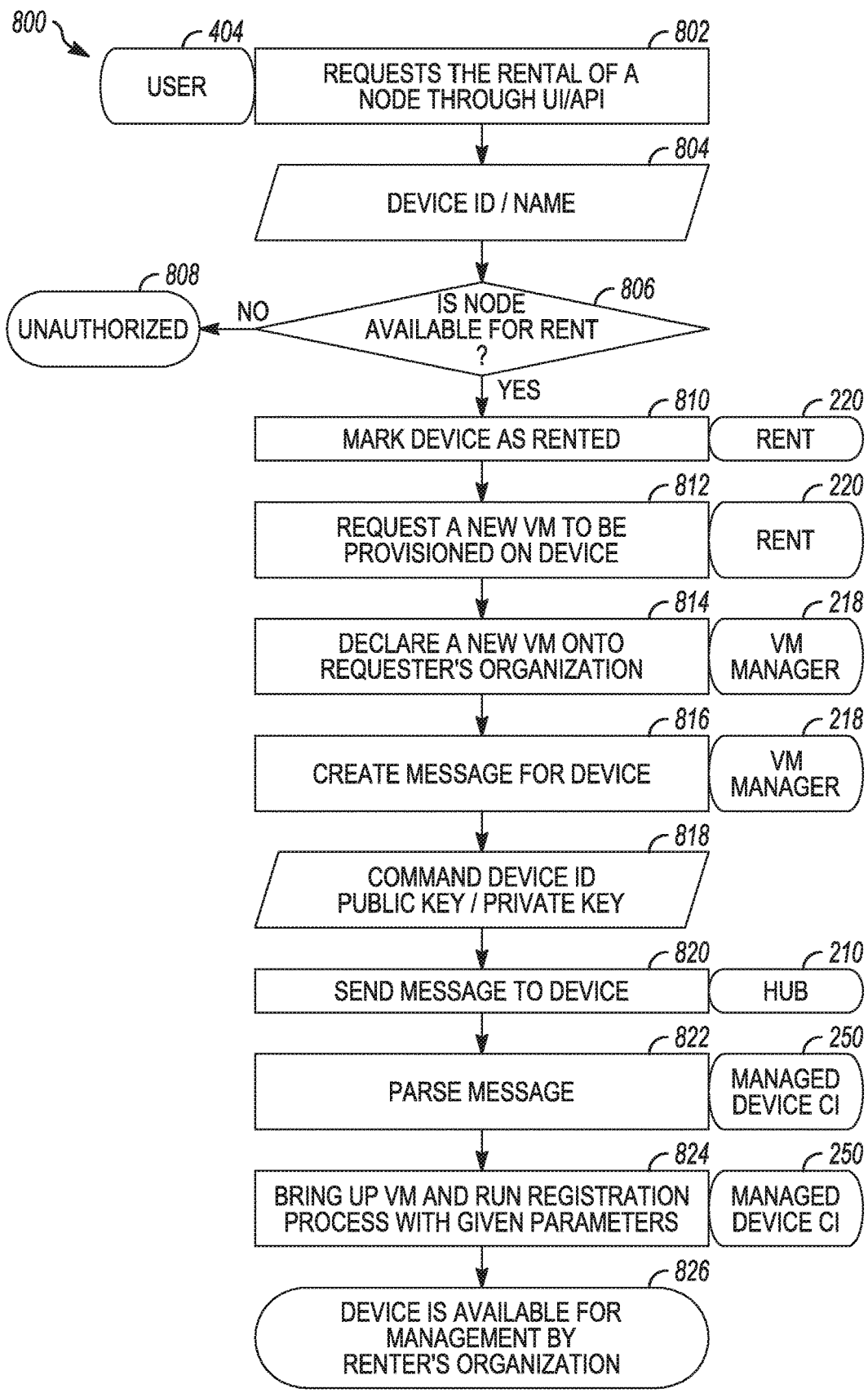
FIG. 8 is a flowchart of a method, in accordance with an example embodiment, for renting a device in the integrated edge cloud system.

FIG. 8 is a flow chart of a method 800, in accordance with an example embodiment, for renting a device in the integrated edge cloud system. The method 800 may be deployed on the system 200 and, accordingly, is described by way of example with reference thereto. It is, however, to be appreciated that the method 800 may be deployed in any hardware architecture.

Referring to operation 802, the user 404 may request rental of a node (e.g., a managed device 202) through the web browser 262 of the user computer 204 (or any other computer) or through the API 212. The request is then sent via the portal 214 to the API 212 for processing. Included in the request is a device ID of the managed device to be rented, and the name of the device as shown at operation 804. Thereafter, at decision operation 806, a determination is made whether or not the node or managed device 202 is available for rent. If not, the request is denied and unauthorized as shown at operation 808. However, if the node or managed device is available for rent, then the method 800 proceeds to operation 810 where the requested managed device 202 is marked as rented by the node rental manager 220. Thereafter, for example, a request for a new virtual machine to be provisioned on the managed device is generated by the node rental manager 220 as shown at operation 812.

The virtual machine manager 218 then declares a new virtual machine onto the requester's organization (see operation 814). The virtual machine manager 218 also creates a message for communication to the managed device 202 as shown at operation 816. In the message to the managed device 202, as shown at operation 818, is the command to start a virtual machine, the device ID, a public key, and a private key. The message, including the aforementioned information, is then sent at operation 820 to the managed device 202 by the communication hub 210. Thereafter, at operation 822, the managed device CI 250 parses the message and brings up a virtual machine at the managed device 202 (see operation 824). Further, the managed device CI 250 runs a registration process on the virtual machine with the parameters that have been received. This process declares the virtual machine as a managed device 202. Thereafter, as shown at operation 826, the new managed device 202 (e.g., the virtual machine) is available for management by the renter's organization using the user computer 204. The payments manager 224 may manage payments for rental of the server or any other installation on the new managed device 202.

In a conventional server deployment environment, when a new virtual server instance is deployed on Amazon Web Services (AWS™) or Google Cloud™, upon conclusion of the installation process, an Internet Protocol (IP) address is provided by the service. This IP address is a public IP address, and the installation process guides the new user through a firewall configuration to access the virtual machine. This firewall configuration has a default configuration to allow only SSH communications by default. The user can either give the service provider an associated public key, or the user can create a new public key (e.g., an Amazon created key). The user then gains access to the virtual machine using the public key and not through a username and a password. Since the IP address of the virtual server is a publicly accessible, the virtual machine is open to unauthorized access if any person has access to the key pair or in case of a vulnerability in the SSH service or its configuration. Accordingly, the server is at risk of a malicious attack.

In a managed device 202, all inbound ports in a firewall may be closed. All management communications are controlled by the communication hub 210 in a peer-to-peer manner using, for example, MQTT protocol communicating with the managed device CI 250 and the user CI 264. In an example embodiment, as all communications are originated as outbound connections, the managed device 202 is never exposed to the public but devices can be managed seamlessly regardless of physical location through the management system 206. Similarly, the SD-WAN manager 208 allows peer-to-peer connections to be established behind fully closed firewalls by using outbound connections. These peer-to-peer communications are only allowed when two devices are associated with the same peer group. Thus, peer groups may be used to determine a baseline level of trust between devices. The management system 206, at the request of a user computer 204, may create a trusted layer between the user computer and the managed device 202.

As trust is based on peer groups, a user could be removed from a peer group, and would then no longer have access to any of managed devices 202 in that peer group. Similarly, when a user is removed from an organization, the management system 206 may instantly terminate access to all management functions for the managed devices 202 within that organization. This is in contrast to conventional installations where a user would have access to a virtual server if the user still has the necessary private key unless the configuration of every machine is independently modified to disallow it. For large organizations having hundreds or thousands of virtual machines, this could involve a significant amount of effort. A determination would need to be made what machines a user had access to and then the public/private keys for all the servers would need to be changed. However, in the system 200, SSH access is never required to manage a machine and discouraged since all management can be performed through the API 212. Additionally, removal from the peer group would immediately make the managed device 202 unreachable through the network, therefore giving an additional layer of protection to the managed device 202.

Further, the management system 206, with its metrics and auditing manager 226, can monitor all actions performed within the system 200. This may be accomplished using the internal message queue 228

Figure 9:
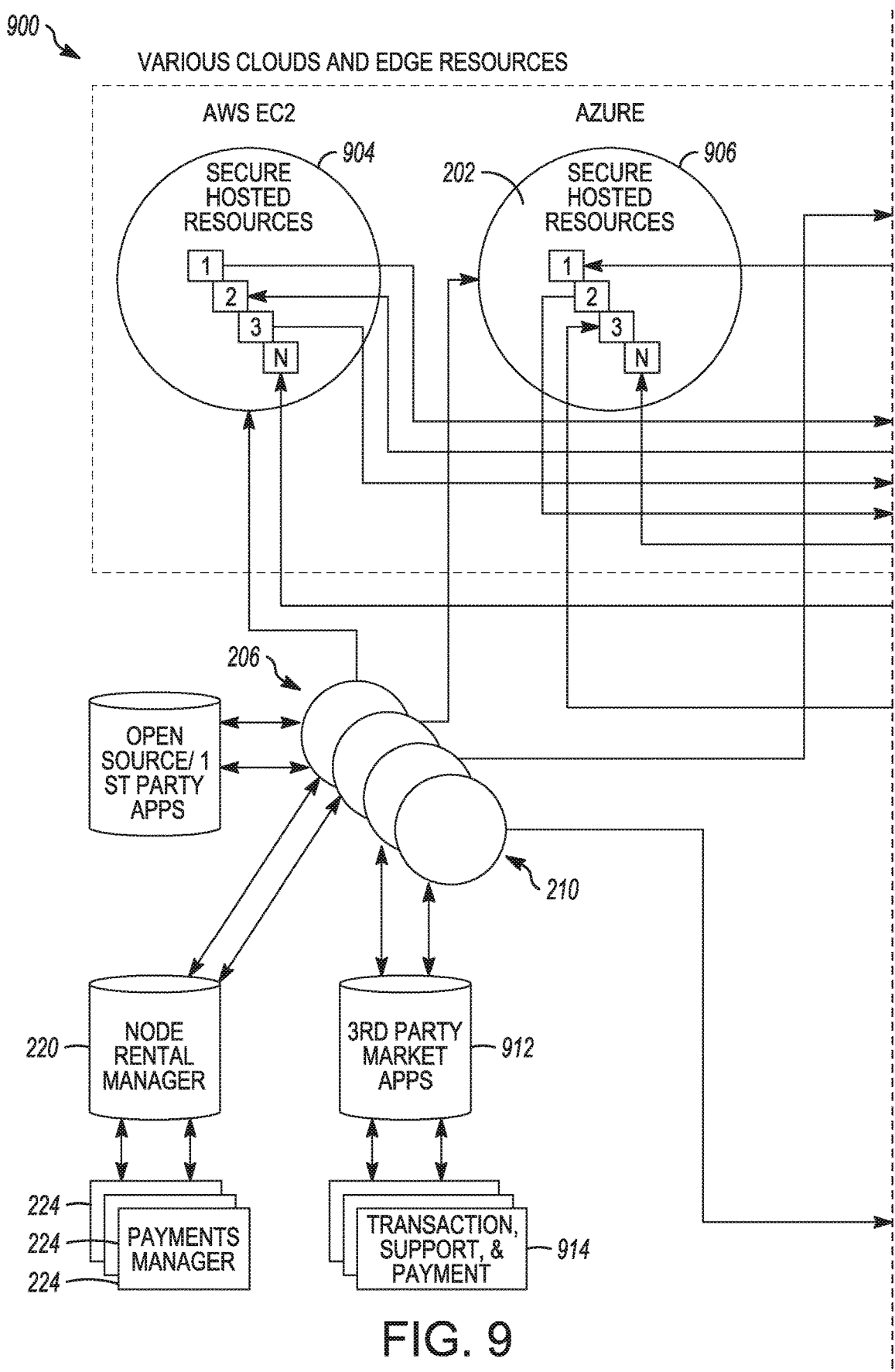
FIG. 9 is an example architecture of a system, in accordance with an example embodiment, showing hybrid cloud and edge resources.
Figure 9:
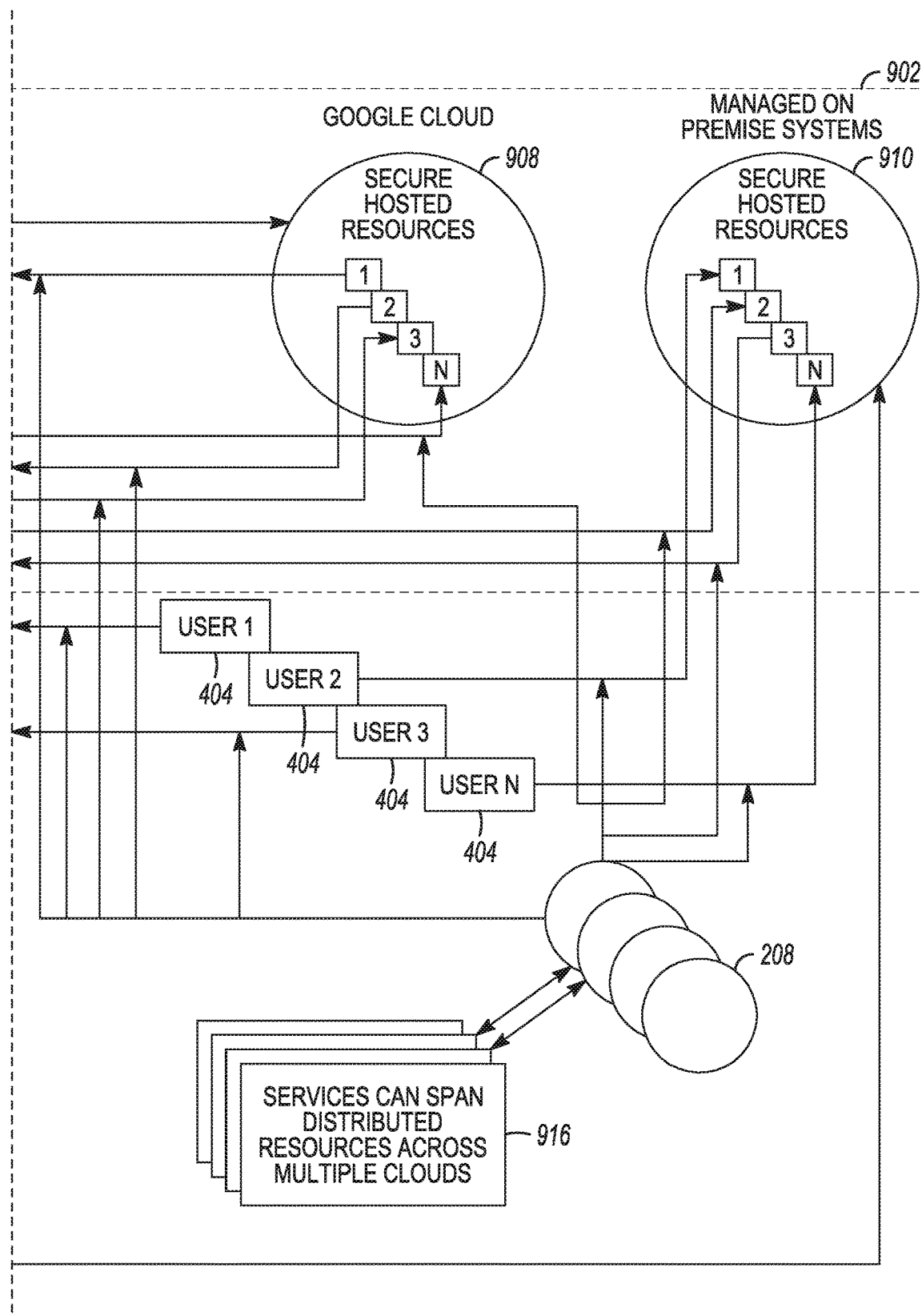

FIG. 9 is an example architecture of a system 900, in accordance with an example embodiment, showing hybrid cloud and edge resources 902. The system 900 may be used to implement any of the hardware described herein.

In the system 900, various components and nodes of the system 900 are shown to be distributed. Further, the system 900 includes a plurality of different and distributed cloud resources. In particular, the hybrid cloud and edge resources 902 are shown to include AWS™ secure hosted resources 904, Azure™ secure hosted resources 906, and Google Cloud™ secure hosted resources 908 hosted in the cloud. Further, the system 900 is shown to include managed-on-premise secure hosted resources 910. Each of the secure hosted resources 904, 906, 908, and 910 include the various managed device software components 203 (see FIG. 2). Further, in the system 900 some or all of the management modules 215 may be distributed (see the node rental manager 220, the communication hub 210, the payments manager 224, the SD-WAN manager 208, and so on). Further, multiple instances of each of these modules may occur in the system 900. However, it will be noted that all instances are controlled and communicate with the cloud edge resources 902 via the communication hubs 210. The system 900 is further shown to include third-party market applications 912 and a transaction, support, and payments gateway 914. The third-party market applications 912 may be substantially similar to the application manager 216 and the transaction, support, and payments gateway 914 may be substantially similar to the payments manager 224. As shown at 916, services can span distributed resources across multiple clouds via peer groups, as herein before described by way of example. The system 900 in addition, or instead, may include hardware provided by any hardware provider, such as Dell™, Lenovo™, or the like, and be located anywhere on one or more networks.

In view of the disclosure above, various examples are set forth below. It should be noted that one or more features of an example, taken in isolation or combination, should be considered within the disclosure of this application.

EXAMPLE 1

A non-transitory machine-readable storage medium comprising instructions, that when executed by a processor, cause the processor to preform operations comprising:

receiving, an Application Program Interface (API) of a management system, a request from a user computer to use of one or more managed devices managed by the management system;

sending and receiving messages, via a publish/subscribe messaging platform of the management system, to the one or more managed devices, the messages controlling installation of applications requested by at least one user computer and allowing communications between managed devices based on topics;

deploying the applications on the one or managed device using the messaging platform; and processing payment for the use of the one or more managed devices.

EXAMPLE 2

The non-transitory machine-readable storage medium of Example 1, wherein the operations further comprise communicating with a managed device command interface, via the publish/subscribe messaging platform, to define actions allowable by the managed device.

EXAMPLE 3

The non-transitory machine-readable storage medium of Examples 1 and/or 2, wherein the operations further comprise communicating, via the publish/subscribe messaging platform, to manage a computing node deployed on the one or more managed devices.

EXAMPLE 4

The non-transitory machine-readable storage medium of any one or more of Examples 1-3, wherein the operations further comprise deploying virtual machines on one or more of the managed devices, the deployment of the virtual machines being based on communications via the publish/subscribe messaging platform.

EXAMPLE 5

The non-transitory machine-readable storage medium of one or more of Examples 1-4, wherein the management system provides a centralized marketplace for renting a plurality of managed devices and deploying applications on the managed devices, payment for use of the managed devices and applications deployed in the centralized marketplace being managed by communications with a payments manager.

EXAMPLE 6

A system to manage a plurality of managed devices, the system comprising:

an Application Program interface (API) configured to communicate with at least one user computer, the at least one user computer operatively to request use of one or more of the managed devices;

a messaging platform configured to send and receive messages to the plurality of managed devices, the messaging platform operating using a publish/subscribe protocol, the messages controlling installation of applications requested by the at least one user computer and allowing communications between managed devices based on topics;

an application manager in communication with the messaging platform to deploy applications on one or more of the managed devices; and a payments manager to process payment for the use of the one or more managed devices.

EXAMPLE 7

The system of Example 6, wherein the messaging platform operatively communicates with a managed device command interface to define actions allowable by the managed device.

EXAMPLE 8

The system of Examples 6 and/or 7, wherein the actions include commands that can be entered via a keyboard of a managed device.

EXAMPLE 9

The system of one or more of Examples 6-8, wherein the publish/subscribe protocol is selected from the group consisting of Message Queuing Telemetry Transport (MQTT) protocol Message Queuing Protocol (AMQP), Constrained Application Protocol (CoAP), Extensible Messaging Presence Protocol (XMPP), and WebSockets.

EXAMPLE 10

The system of one or more of Examples 6-9, further comprising a node rental manager operatively communicating via the messaging platform to manage a computing node deployed on the one or more managed devices.

EXAMPLE 11

The system of one or more of Examples 6-10, wherein the node rental manager publishes events to uninstall applications on one or more of the managed devices based on data provided by the payments manager.

EXAMPLE 12

The system of one or more of Examples 6-11, comprising a Wide Area Network (WAN) interface to communicate with a network service component on a managed device.

EXAMPLE 13

The system of one or more of Examples 6-12, further comprising a virtual machine manager to deploy virtual machines on one or more of the managed devices, the deployment of the virtual machines being based on communications via the messaging platform.

EXAMPLE 14

The system of one or more of Examples 6-13, further comprising an internal messaging arrangement for controlling and storing messages communicated by the messaging platform.

EXAMPLE 15

The system of one or more of Examples 6-14, wherein messages of the internal messaging arrangement are analyzed by a plurality of analytics processes, the system including an analytics database to store results of the analytics processes.

EXAMPLE 16

The system of one or more of Examples 6-15, further comprising a metrics and auditing manager to process messages in the internal message queue.

EXAMPLE 17

The system of one or more of Examples 6-16, wherein the user defined operations include installing applications on managed devices.

EXAMPLE 18

The system of one or more of Examples 6-17, wherein the user defined operations install containerized applications using an OS-level virtualization process.

EXAMPLE 19

A method comprising:
receiving, at an Application Program Interface (API) of a management system, a request from a user computer to use of one or more managed devices managed by the management system;
sending and receiving messages, via a publish/subscribe messaging platform of the management system, to the one or more managed devices, the messages controlling installation of applications requested by at least one user computer and allowing communications between managed devices based on topics;
deploying the applications on the one or managed device using the messaging platform; and
processing payment for the use of the one or more managed devices.

EXAMPLE 20

The method of Example 19, wherein the management system provides a centralized marketplace for renting a plurality of managed devices and deploying applications on the managed devices, payment for use of the managed devices and applications deployed in the centralized marketplace being managed by communications with a payments manager.

Figure 10:
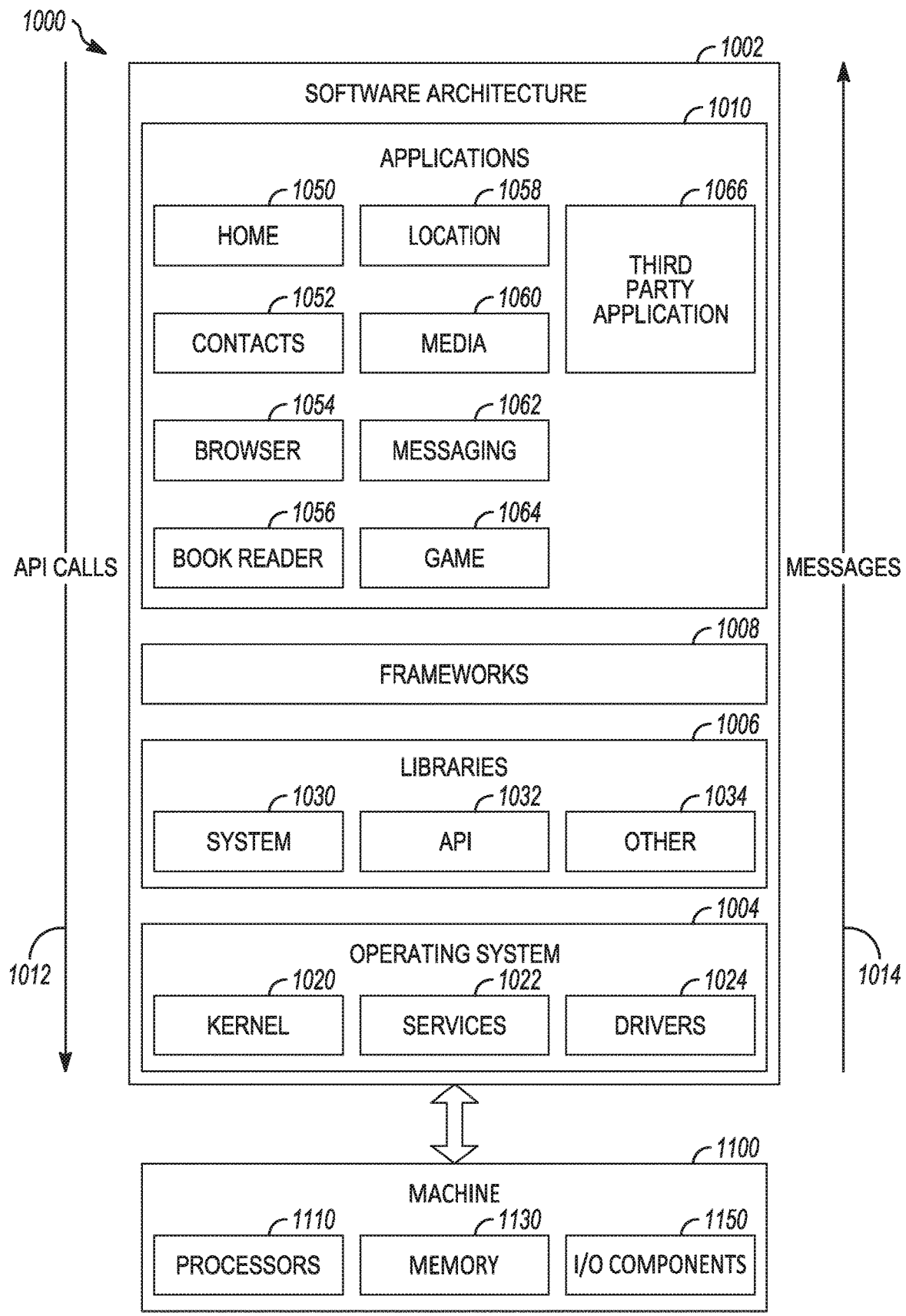
FIG. 10 is a block diagram illustrating an architecture of software, which can be installed on any one or more of the devices described herein.

FIG. 10 is a block diagram 1000 illustrating a software architecture 1002, which can be installed on any one or more of the devices described herein. FIG. 10 is merely a non-limiting example of a software architecture, and it will be appreciated that many other architectures can be implemented to facilitate the functionality described herein. In various embodiments, the software architecture 1002 is implemented by hardware such as a machine 1100 of FIG. 11 that includes processors 1110, memory 1130, and input/output (I/O) components 1150. In this example architecture, the software architecture 1002 can be conceptualized as a stack of layers where each layer may provide a particular functionality. For example, the software architecture 1002 includes layers such as an operating system 1004, libraries 1006, frameworks 1008, and applications 1010. Operationally, the applications 1010 invoke API calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and three-dimensional (3D) in a graphic context on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various graphical user interface (GUI) functions, high-level resource management, high-level location services, and so forth. The frameworks 1008 can provide a broad spectrum of other APIs that can be utilized by the applications 1010, some of which may be specific to a particular operating system 1004 or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications, such as a third-party application 1066. According to some embodiments, the applications 1010 are programs that execute functions defined in the programs. Various programming languages can be employed to create one or more of the applications 1010, structured in a variety of manners, such as object-oriented programming languages (e.g., Objective-C, Java, or C++) or procedural programming languages (e.g., C or assembly language). In a specific example, the third-party application 1066 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1066 can invoke the API calls 1012 provided by the operating system 1004 to facilitate functionality described herein.

Figure 11:
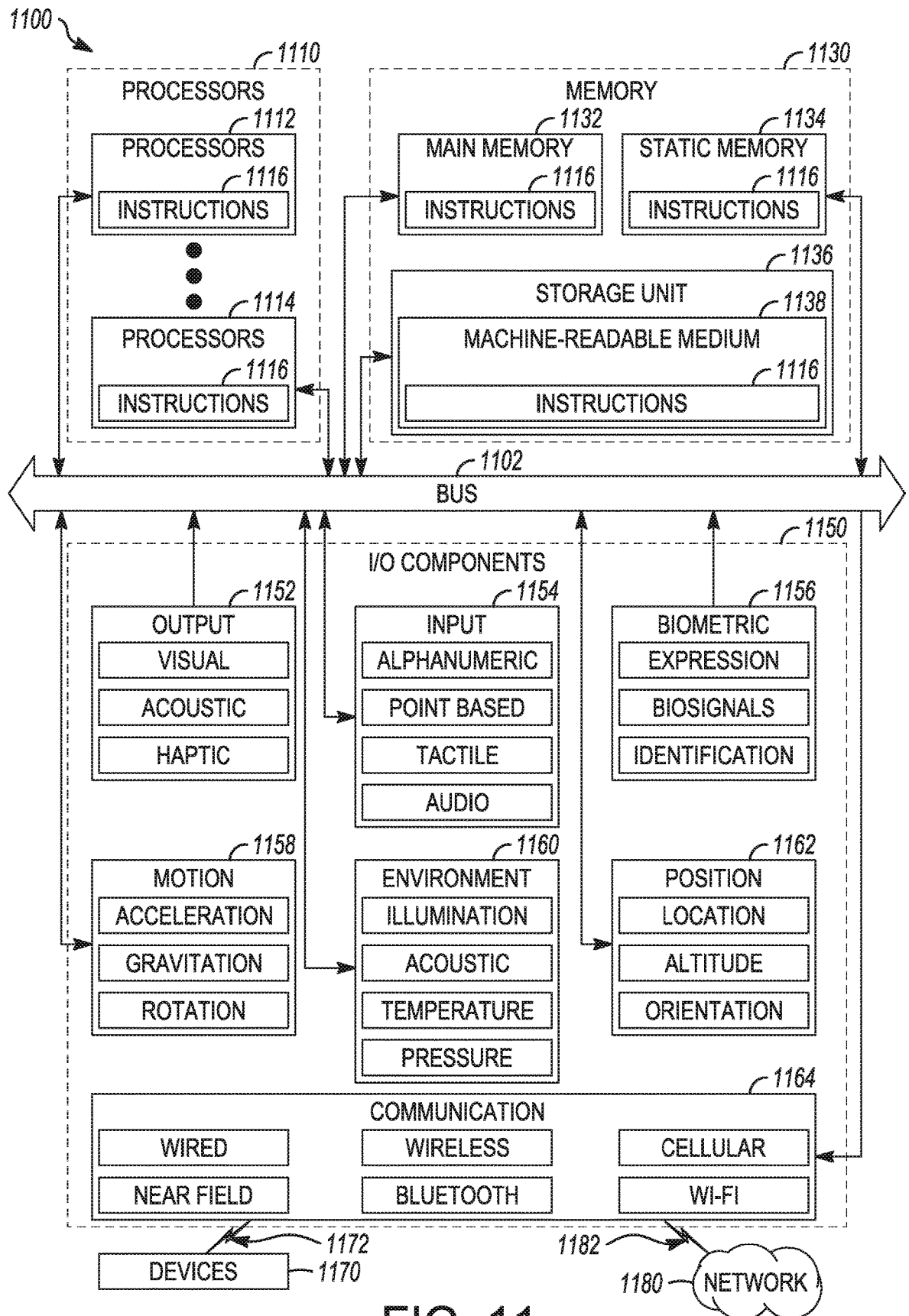
FIG. 11 illustrates a diagrammatic representation of a machine in the form of a computer system within which a set of instructions may be executed for causing the machine to perform any one or more of the methodologies discussed herein, according to an example embodiment.

FIG. 11 illustrates a diagrammatic representation of a machine 1100 in the form of a computer system within which a set of instructions may be executed for causing the machine 1100 to perform any one or more of the methodologies discussed herein, according to an example embodiment. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example, the instructions 1116 may cause the machine 1100 to execute the methods of FIGS. 3-8. The instructions 1116 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory 1130, and I/O components 1150, which may be configured to communicate with each other such as via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1112 and a processor 1114 that may execute the instructions 1116. The term "processor" is intended to include multi-core processors that may comprise two or more independent processors (sometimes referred to as "cores") that may execute instructions 1116 contemporaneously. Although FIG. 11 shows multiple processors 1110, the machine 1100 may include a single processor 1112 with a single core, a single processor 1112 with multiple cores (e.g., a multi-core processor 1112), multiple processors 1112, 1114 with a single core, multiple processors 1112, 1114 with multiple cores, or any combination thereof.

The memory 1130 may include a main memory 1132, a static memory 1134, and a storage unit 1136, each accessible to the processors 1110 such as via the bus 1102. The main memory 1132, the static memory 1134, and the storage unit 1136 store the instructions 1116 embodying any one or more of the methodologies or functions described herein. The instructions 1116 may also reside, completely or partially, within the main memory 1132, within the static memory 1134, within the storage unit 1136, within at least one of the processors 1110 (e.g., within the processor's cache memory), or any suitable combination thereof, during execution thereof by the machine 1100.

The I/O components 1150 may include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion, and the grouping is in no way limiting. In various example embodiments, the I/O components 1150 may include output components 1152 and input components 1154. The output components 1152 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162, among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1162 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., coupled via a USB).

Moreover, the communication components 1164 may detect identifiers or include components operable to detect identifiers. For example, the communication components 1164 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geolocation, location via Wi-Fi® signal triangulation, location via detecting an NFC beacon signal that may indicate a particular location, and so forth.

The various memories (e.g., 1130, 1132, 1134, and/or memory of the processor(s) 1110) and/or the storage unit 1136 may store one or more sets of instructions 1116 and data structures ., software) embodying or utilized by any one or more of the methodologies or functions described herein. These instructions (e.g., the instructions 1116), when executed by the processor(s) 1110, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1180 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

Further, certain embodiments are described herein as including logic or a number of components, modules, or mechanisms. Modules, as mentioned hereinbefore, may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations, Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Embodiments may be implemented in digital electronic circuitry, in computer hardware, firmware, or software, or in combinations of them. Embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A non-transitory machine-readable storage medium comprising instructions, that when executed by a processor, cause the processor to preform operations comprising:
receiving, at an Application Program Interface (API) of a management system, a request from a first user to use of one or more managed devices managed by the management system;
adding the first user to an existing organization based on an authorization from a second user with administrative privileges;
sending and receiving messages, via a publish/subscribe messaging platform of the management system that ensures that authorized users only carry out authorized operations, to the one or more managed devices, the messages controlling installation of containerized applications requested by at least one user computer and allowing communications between managed devices based on topics;

deploying the containerized applications on the one or managed device using the publish/subscribe messaging platform; and processing payment for the use of the one or more managed devices.

2. The non-transitory machine-readable storage medium of claim 1, wherein the operations further comprise communicating with a managed device command interface, via the publish/subscribe messaging platform, to define actions allowable by the managed device.

3. The non-transitory machine-readable storage medium of claim 1, wherein the operations further comprise communicating, via the publish/subscribe messaging platform, to manage a computing node deployed on the one or more managed devices.

4. The non-transitory machine-readable storage medium of claim 1, wherein the operations further comprise deploying virtual machines on one or more of the managed devices, the deployment of the virtual machines being based on communications via the publish/subscribe messaging platform.

5. The non-transitory machine-readable storage medium of claim 1, wherein the management system provides a centralized marketplace for renting a plurality of managed devices and deploying applications on the managed devices, payment for use of the managed devices and applications deployed in the centralized marketplace being managed by communications with a payments manager.

6. A system to manage a plurality of managed devices, the system comprising:
an Application Program Interface (API) configured to communicate with at least one user computer, the at least one user computer operatively to request use of one or more of the managed devices;
a messaging platform configured to send and receive messages to the plurality of managed devices, the messaging platform operating using a publish/subscribe protocol that ensures that authorized users only carry out authorized operations, the messages controlling installation of containerized applications requested by the at least one user computer and allowing communications between managed devices based on topics;
an authentication manager configured to add users to existing organizations based on authorization received from a user with administrative privileges;
an application manager in communication with the messaging platform to deploy containerized applications on one or more of the managed devices; and
a payments manager to process payment for the use of the one or more managed devices.

7. The system of claim 6, wherein the messaging platform operatively communicates with a managed device command interface to define actions allowable by the managed device.

8. The system of claim 7, wherein the actions include commands that can be entered via a keyboard of a managed device.

9. The system of claim 6, wherein the publish/subscribe protocol is selected from the group consisting of Message Queuing Telemetry Transport (MQTT) protocol Message Queuing Protocol (AMQP), Constrained Application Protocol (CoAP), Extensible Messaging Presence Protocol (XMPP), and WebSockets.

10. The system of claim 6, further comprising a node rental manager operatively communicating via the messaging platform to manage a computing node deployed on the one or more managed devices.

11. The system of claim 10, wherein the node rental manager publishes events to uninstall applications on one or more of the managed devices based on data provided by the payments manager.

12. The system of claim 6, comprising a Wide Area Network (WAN) interface to communicate with a network service component on a managed device.

13. The system of claim 6, further comprising a virtual machine manager to deploy virtual machines on one or more of the managed devices, the deployment of the virtual machines being based on communications via the messaging platform.

14. The system of claim 6, further comprising an internal message queue for controlling and storing messages communicated by the messaging platform.

15. The system of claim 14, wherein messages of the internal message queue are analyzed by a plurality of analytics processes, the system including an analytics database to store results of the analytics processes.

16. The system of claim 15, further comprising a metrics and auditing manager to process messages in the internal message queue.

17. The system of claim 6, wherein the installation of the containerized applications uses an OS-level virtualization process.

18. A method comprising:
receiving, at an Application Program Interface (API) of a management system, a request from a first user to use of one or more managed devices managed by the management system;
adding the first user to an existing organization based on an authorization from a second user with administrative privileges;
sending and receiving messages, via a publish/subscribe messaging platform of the management system that ensures that authorized users only carry out authorized operations, to the one or more managed devices, the messages controlling installation of containerized applications requested by at least one user computer and allowing communications between managed devices based on topics;
deploying the containerized applications on the one or managed device using the messaging platform; and
processing payment for the use of the one or more managed devices.

19. The method of claim 18, wherein the management system provides a centralized marketplace for renting a plurality of managed devices and deploying applications on the managed devices, payment for use of the managed devices and applications deployed in the centralized marketplace being managed by communications with a payments manager.

20. The method of claim 18, further comprising:
communicating with a managed device command interface, via the publish/subscribe messaging platform, to define actions allowable by the managed device.

* * * * *